United States Patent
Campagna et al.

(10) Patent No.: US 9,819,483 B2
(45) Date of Patent: *Nov. 14, 2017

(54) KEY AGREEMENT FOR WIRELESS COMMUNICATION

(71) Applicant: Certicom Corp., Mississauga (CA)

(72) Inventors: Matthew John Campagna, Ridgefield, CT (US); Daniel Richard L. Brown, Mississauga (CA); Nevine Maurice Nassif Ebeid, Kitchener (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,637

(22) Filed: Jan. 23, 2015

(65) Prior Publication Data

US 2015/0139424 A1 May 21, 2015

Related U.S. Application Data

(63) Continuation of application No. 13/536,747, filed on Jun. 28, 2012, now Pat. No. 8,971,851.

(51) Int. Cl.
*H04K 1/00* (2006.01)
*H04L 9/08* (2006.01)
(Continued)

(52) U.S. Cl.
CPC .......... *H04L 9/0819* (2013.01); *H04L 9/0866* (2013.01); *H04L 9/14* (2013.01);
(Continued)

(58) Field of Classification Search
CPC ..... H04W 12/06; H04W 12/04; H04W 12/02; H04W 12/08
See application file for complete search history.

(56) References Cited

U.S. PATENT DOCUMENTS 5,537,474 A 7/1996 Brown et al.
7,856,102 B2 12/2010 Hatakeyama
(Continued)

FOREIGN PATENT DOCUMENTS

CN 1665183 9/2005
CN 101114957 1/2008
(Continued)

OTHER PUBLICATIONS

Office Action dated Jul. 19, 2013, in co-pending U.S. Appl. No. 13/536,686, 19 pages.
(Continued)

*Primary Examiner* — Khalid Shaheed
*Assistant Examiner* — K Wilford
(74) *Attorney, Agent, or Firm* — Jon Gibbons; Fleit Gibbons Gutman Bongini & Bianco P.L.

(57) ABSTRACT

Methods, systems, and computer programs for performing key agreement operations in a communication system are described. In some aspects, a wireless network operator receives a mobile device identifier and accesses a secret key associated with the mobile device. A message authentication code function is evaluated based on the secret key to produce an output value. A session key and a challenge value are obtained based on the output value. In some aspects, a mobile device accesses a secret key in response to receiving the challenge value from the wireless network operator. A message authentication code function is evaluated based on the secret key to produce an output value. A response value and a session key are obtained based on the output value. The response value is transmitted to the wireless network operator.

20 Claims, 15 Drawing Sheets

(51) Int. Cl.
*H04L 9/14* (2006.01)
*H04W 12/04* (2009.01)
*H04L 29/06* (2006.01)
*H04W 12/02* (2009.01)
*H04W 12/10* (2009.01)

(52) U.S. Cl.
CPC .......... *H04W 12/04* (2013.01); *H04L 63/123* (2013.01); *H04L 2209/24* (2013.01); *H04L 2209/80* (2013.01); *H04L 2463/061* (2013.01); *H04W 12/02* (2013.01); *H04W 12/10* (2013.01)

(56) References Cited

U.S. PATENT DOCUMENTS

| | | | |
|---|---|---|---|
| 8,971,851 B2 | 3/2015 | Campagna et al. | |
| 2006/0141987 A1* | 6/2006 | De Groot | H04L 63/0414 455/411 |
| 2006/0281441 A1* | 12/2006 | Okochi | G06Q 30/0225 455/411 |
| 2008/0125084 A1* | 5/2008 | Cambois | H04W 88/02 455/411 |
| 2008/0240443 A1* | 10/2008 | Vuillaume et al. | 380/277 |
| 2009/0083833 A1* | 3/2009 | Ziola et al. | 726/2 |
| 2009/0209232 A1 | 8/2009 | Cha et al. | |
| 2009/0210714 A1* | 8/2009 | Haider | H04L 9/3236 713/176 |
| 2010/0153728 A1 | 6/2010 | Brown | |
| 2010/0203864 A1* | 8/2010 | Howard | H04W 12/04 455/411 |
| 2010/0227591 A1* | 9/2010 | Park et al. | 455/411 |
| 2010/0228980 A1* | 9/2010 | Falk et al. | 713/171 |
| 2010/0257360 A1* | 10/2010 | Bae et al. | 713/168 |
| 2010/0293379 A1 | 11/2010 | Nie | |
| 2011/0004758 A1* | 1/2011 | Walker et al. | 713/168 |
| 2011/0191252 A1 | 8/2011 | Dai | |
| 2011/0208970 A1 | 8/2011 | Brown et al. | |
| 2012/0011362 A1 | 1/2012 | Lambert | |
| 2012/0027201 A1 | 2/2012 | Fujisaki et al. | |
| 2012/0131322 A1 | 5/2012 | Smith et al. | |
| 2012/0191971 A1* | 7/2012 | Battistello | H04L 9/083 713/155 |
| 2012/0297473 A1 | 11/2012 | Case et al. | |
| 2013/0080769 A1* | 3/2013 | Cha et al. | 713/155 |
| 2013/0155948 A1 | 6/2013 | Pinheiro et al. | |
| 2014/0004824 A1* | 1/2014 | Campagna et al. | 455/411 |

FOREIGN PATENT DOCUMENTS

| | | |
|---|---|---|
| CN | 101175076 | 5/2008 |
| CN | 101375545 | 2/2009 |
| CN | 101810018 | 8/2010 |
| CN | 101981863 | 2/2011 |
| WO | 2014004688 | 1/2014 |

OTHER PUBLICATIONS

Hai Huang, et al. "An ID-based Authenticated Key Exchange Protocol Based on Bilinear Diffie-Hellman Problem", International Association for Cryptologic Research, vol. 20081213:061843, Dec. 13, 2008, pp. 1-10.
Sherman S. M. Chow, et al. "Strongly-Secure Identity-based Key Agreement and Anonymous Extension", International Association for Cryptologic Research, vol. 20080103:075535, Jan. 3, 2008, pp. 1-24.
Fengjiao Wang, et al. "A New Provably Secure Authentication and Key Agreement Mechanism for SIP Using Certificateless Public-key Cryptography", International Association for Cryptologic Research, vol. 20070608:203632, Jun. 7, 2007, pp. 1-15.
Menezes, Alfred J. et al. "Handbook of Applied Cryptography", 1997, pp. 359-368, 497-499, CRC Press LLC, USA.

Office Action dated Jan. 6, 2014, in co-pending U.S. Appl. No. 13/536,686, 17 pages.
Office Action dated Jan. 13, 2014, in co-pending U.S. Appl. No. 13/534,948, 17 pages.
Office Action dated Jun. 13, 2014, in co-pending U.S. Appl. No. 13/534,948, 23 pages.
3GPP TS 33.102 v3.5.0: "Universal Mobile Telecommunications System (UMTS); 3G Security; Security Architecture," 2000, 60 pages.
3GPP TS 33.105 v3.4.0: "Universal Mobile Telecommunications System (UMTS); 3G Security; Cryptographic Algorithm Requirements," 2000, 27 pages.
NIST Special Publication 800-108 Recommendation for Key Derivation Using Pseudorandom Functions (Revised), Oct. 2009, 21 pages.
3GPP TS 35.205 v1 0.0.0: "Universal Mobile Telecommunications System (UMTS); L TE; 3G Security; Specification of the Milenage Algorithm Set: An example algorithm set for the 3GPP authentication and key generation functions f1, f1*, f2, f3, f4, f5 and f5*," 2011, 17 pages.
Korean Office Action dated Oct. 26, 2015 received for Korean Application No. 10-2015-7002418.
Canadian Office Action dated Mar. 10, 2016, received for Canadian Application No. 2,877,490.
Non-Final Office Action dated Jan. 13, 2014, received for U.S. Appl. No. 13/534,948.
Final Office Action dated Jun. 13, 2014, received for U.S. Appl. No. 13/534,948.
Final Office Action dated Jan. 6, 2014, received for U.S. Appl. No. 13/536,686.
Non-Final Office Action dated Jul. 19, 2013, received for U.S. Appl. No. 13/536,686.
Universal Mobile Telecommunications System (UMTS); LTE; 3G security; Security Architecture 2011, (3GPP TS 33.102 version 10.0.0 Release 10), ETSI TS 133 102 V10.0.0 (May 2011), Technical Specification, 73 pages, Sophia Antipolis Cedex, France.
International Search Report and Written Opinion dated Nov. 8, 2013 in WIPO Application No. PCT/US2013/047921, filed Jun. 26, 2013.
Hai Huang, et al., "An ID-based Authenticated Key Exchange Protocol Based on Bilinear Diffie-Hellman Problem", International Association for Cryptologic Research, vol. 20081213:061843, Dec. 13, 2008, pp. 1-10.
Sherman S. M. Chow, et al., "Strongly-Secure Identity-based Key Agreement and Anonymous Extension", International Association for Cryptologic Research, vol. 20080103:075535, Jan. 3, 2008, pp. 1-24.
Fengjiao Wang, et al., "A New Provably Secure Authentication and Key Agreement Mechanism for SIP Using Certificateless Public-key Cryptography", International Association for Cryptologic Research, vol. 20070608:203632, Jun. 7, 2007, pp. 1-15.
3GPP TS 33.102 v3.5.0, "Universal Mobile Telecommunications System (UMTS); 3G Security; Security Architecture," 2000, 60 pages.
3GPP TS 33.105 v3.4.0, "Universal Mobile Telecommunications System (UMTS); 3G Security; Cryptographic Algorithm Requirements," 2000, 27 pages.
3GPP TS 35.205 v10.0.0, "Universal Mobile Telecommunications System (UMTS); LTE; 3G Security; Specification of the Milenage Algorithm Set: An example algorithm set for the 3GPP authentication and key generation functions f1, f1*, f2, f3, f4, f5 and f5*," 2011, 17 pages.
X9.63-2011, Public Key Cryptography for the Financial Services Industry—Key Agreement and Key Transport Using Elliptic Curve Cryptography, 2011, 155 pages.
FIPS Pub 198-1 Federal Information Processing Standards Publication, The Keyed-Hash Message Authentication Code (HMAC), 2008, 13 pages.
NIST Special Publication 800-108 Recommendation for Key Derivation Using Pseudorandom Functions (Revised), October 2009, 21 pages.
NIST Special Publication 800-38B Recommendation for Block Cipher Modes of Operation: The CMAC Mode for Authentication, May 2005, 25 pages.

(56) References Cited

OTHER PUBLICATIONS

A. Menezes, P. van Oorschot, and S. Vanstone, "Handbook of Applied Cryptography," Chapter 9—Hash Functions and Data Integrity, CRC Press, 1996, 64 pages.
A. Menezes, P. van Oorschot, and S. Vanstone, "Handbook of Applied Cryptography," Chapter 12—Key Establishment Protocols, CRC Press, 1996, 54 pages.
Extended European Search Report issued Oct. 1, 2013 in European Patent Application No. 13173902.1.
"3rd Generation Partnership Project; Technical Specification Group Services and System Aspects; Rationale and track of security decisions in Long Term Evolved (LTE) RAN/3GPP System Architecture Evolution (SAE) (Release 8)", 3GPP Standard; 3GPP TR 33.821, 3rd Generation Partnership Project (3GPP), Mobile Competence Center; 650, Route Des Lucioles; F-06921 Sophia-Antipolis Cedex; France, No. V1.0.0, Nov. 1, 2008, 136 pages.
"Digital cellular telecommunications system (Phase 2+); Universal Mobile Telecommunications System (UMTS); LTE; 3GPP System Architecture Evolution (SAE); Security Architecture (3GPP TS 33.401 version 10.2.0 Release 10)", Technical Specification, European Telecommunications Standards Institute (ETSI), 650, Route Des Lucioles; F-06921 Sophia-Antipolis; France; vol. 3GPP SA 3, No. V10.2.0, Oct. 1, 2011, 118 pages.
Barker, Elaine et al., NIST Special Publication 800-56A, "Recommendation for Pair-Wise Key Establishment Schemes Using Discrete Logarithm Cryptography (Revised)", Computer Security, National Institute of Standards and Technology (NIST), published by NIST, Mar. 2007, 114 pages.
"ZigBee Control your world; Zigbee Smart Energy Profile Specification", Document 07-5356-17, Mar. 22, 2012, Section 5.3 of Annex C (pp. 130-135), ZigBee Profile: 0x0109, Revision 17, Version 1.1.1, 352 pages.
Chinese Office Action dated Nov. 28, 2016, received for Chinese Application No. 201380045551.3.
Canadian Office Action dated Dec. 6, 2016, received for Canadian Application No. 2,877,490.

* cited by examiner

KEY AGREEMENT FOR WIRELESS COMMUNICATION

CROSS-REFERENCE TO RELATED APPLICATIONS

This application is a continuation application of U.S. patent application Ser. No. 13/536,747, filed on Jun. 28, 2012, which is incorporated herein by reference.

BACKGROUND

This specification relates to performing key agreement operations in a wireless communication system. Many mobile devices are configured to communicate with a wireless network (e.g., Global System for Mobile Communication (GSM), Universal Mobile Telecommunication Services (UMTS), Long-Term Evolution (LTE), etc.). The mobile device and the wireless network can use cryptographic techniques to communicate with confidentiality and authenticity. In some instances, the mobile device and the wireless network perform a key agreement protocol to derive the keys (e.g., ciphering keys, integrity keys, etc.) that are used in cryptographic communication.

BRIEF DESCRIPTION OF THE DRAWINGS

Like reference numbers and designations in the various drawings indicate like elements.

DETAILED DESCRIPTION

Figure 1:
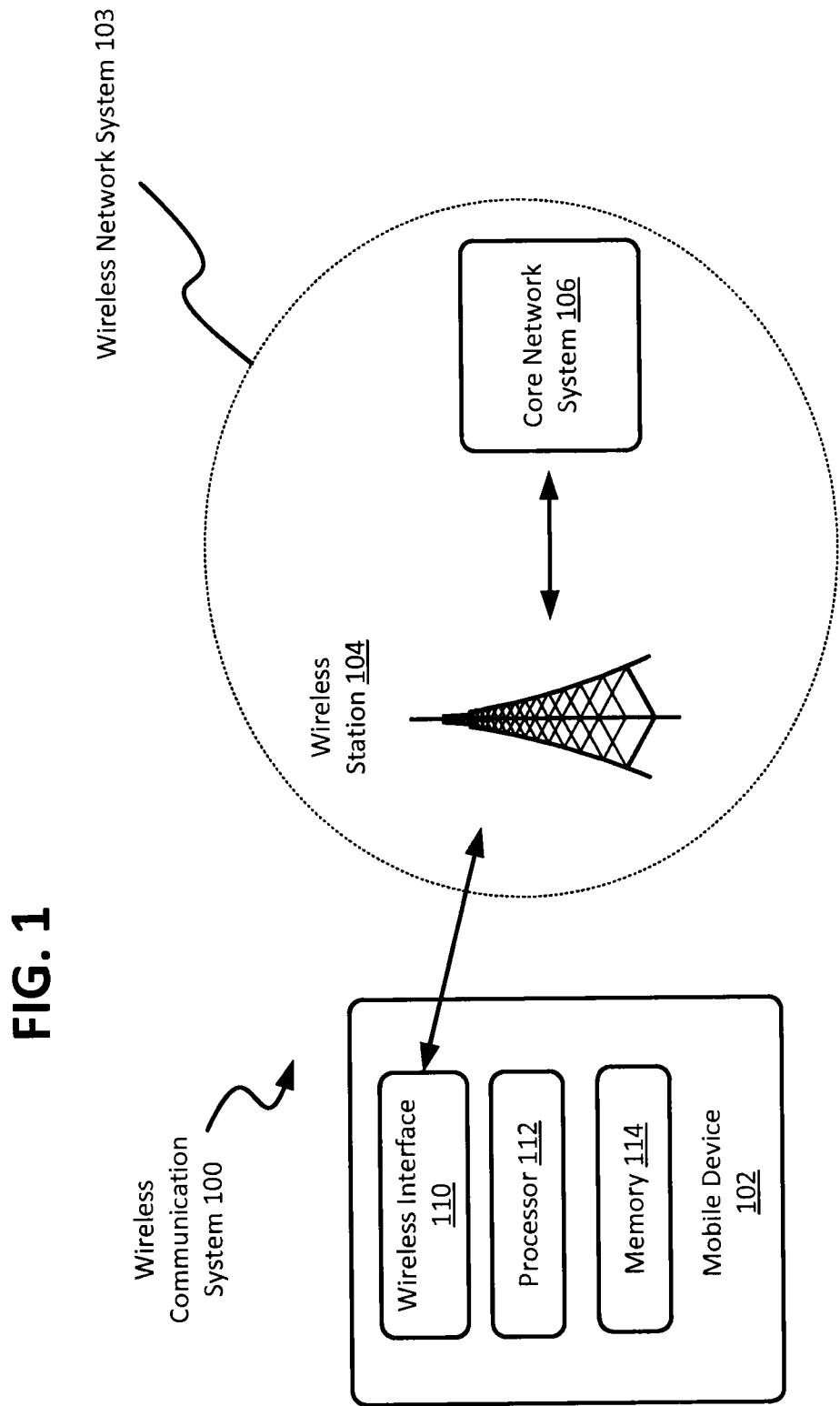
FIG. 1 is a schematic diagram of an example wireless communication system.

Wireless communication systems need security features. Security protocols may be executed, for example, by wireless network servers, by mobile devices accessing the wireless network, or by a combination of these and other components. Multiple factors influence security requirements. In some cases, a device may need to rely on long-term security of a single algorithm. For example, when an embedded universal integrated circuit card (UICC) is installed in a mobile device, the security algorithm may be difficult to modify or replace after installation. In some cases, available security algorithms evolve based on advances in computational capabilities. For example, the computational capability of mobile device technologies continues to generally increase over time. Given these factors, in some contexts, it may be useful to define loose requirements for alternative key agreement and authentication schemes in wireless networks.

In some aspects of what is described here, a mobile device and wireless network operator server can authenticate each other through a third-party wireless network, for example, using a previously-established symmetric key. Key derivation functions (KDFs), message authentication code (MAC) functions, or any suitable combination of them can be used in a larger construct to provide authentication and derive session keys for confidentiality and data integrity. In some instances, the constructs can be deployed within a general framework provided by existing standards (e.g., within a Universal Mobile Telecommunication Services (UMTS) system). In some instances, the solutions described here may provide greater agility between underlying security primitives, for example, by using standardized KDFs or other types of functions. The techniques and systems described here may provide additional or different advantages.

In some implementations, a security protocol utilizes a MAC function. Any suitable MAC function may be used. Generally, a MAC function receives inputs that include a key, an arbitrary-length input message, and possibly other inputs; the MAC function may produce an output of a specified length based on the inputs. The MAC function may generate the output based on any suitable operations, such as, for example, a keyed hash function, an un-keyed hash function, cipher block chaining, or other types of functions.

In some cases, a MAC function can refer to a family of functions $h_k$ parameterized by a key k. A MAC function can have the property of "ease of computation," such that, for a known function $h_k$, given a value k and an input x, $h_k(x)$ is easy to compute. The value $h_k(x)$ may be referred to as a MAC-value or MAC. A MAC function can have the property of "compression," such that, $h_k$ maps an input x of arbitrary finite bit-length to an output $h_k(x)$ of fixed bit-length n. A MAC function can have the property of "computation-resistance." For example, given a description of the function family h, for every fixed allowable value of k (unknown to an adversary), given zero or more text-MAC pairs $(x_i, h_k(x_i))$, it may be computationally infeasible for the adversary to compute any text-MAC pair $(x, h_k(x))$ for any new input $x \neq x_i$ (including possibly for $h_k(x)=h_k(x_i)$ for some i). In some cases, a MAC function is included within a larger function. For example, a MAC function may be included in a key derivation function (KDF) or another type of function.

In some implementations, a security protocol utilizes a KDF. Any suitable KDF may be used. Some example KDFs are the American National Standard Institute (ANSI) X9.63 hash-based KDF using SHA256 defined in ANSI X9.63-2011, the National Institute of Standards and Technology (NIST) counter-mode KDF defined in NIST SP800-108 with CMAC-AES128 from NIST SP800-38B, the NIST counter-mode KDF defined in NIST SP800-108 with keyed-HMAC-SHA256 from FIPS 198-1, and others. These examples can be used, for example, at the 128-bit security level, the 256-bit security level, or at any other suitable level.

KDFs can derive cryptographic keys from input data. The inputs may include, for example, a secret key, a random seed, a constant, or any suitable combination of these or other inputs. The input can include a user password, a random seed value from an entropy source, or a value from a hash function or a cryptographic operation. In some instances, a KDF derives an output from an input key and other inputs by applying a function such as a hash, a keyed hash, or block cipher for one or more iterations. In some cases, an output length is provided as an input to the KDF. The output length variable can specify the bit-length of the output produced by the KDF.

A KDF can include one or more iterated functions. The number of iterations may depend on, for example, the specified length of the output to be produced by the KDF, a security parameter, or other factors. Some types of functions can be iterated, for example, in a counter mode, a feedback mode, a double-pipeline mode, or in another iteration mode. In a counter mode, a KDF can iterate a function n times and concatenate the outputs until L bits of keying material are generated. In this example, $n=\lceil L/h \rceil$, where h is an integer that indicates the length of the output of the iterated function.

FIG. 1 is a schematic diagram of an example wireless communication system 100. The example wireless communication system 100 includes a mobile device 102 and a wireless network system 103. The wireless communication system 100 can include additional or different features and components. For example, the wireless communication system 100 can include one or more servers, computing systems, additional or different networks, wireless terminals, or any suitable combination of these other components. The wireless network system 103 includes a wireless station 104 and a core network system 106. The wireless network system 103 can include additional or different features and components. The components of the wireless communication system 100 can be configured as shown in FIG. 1, or the wireless communication system 100 can be configured in another manner, as appropriate.

In the example shown in FIG. 1, the mobile device 102 can communicate with the wireless network system 103. In some instances, the wireless network system 103 can provide the mobile device 102 access to a wide area network (e.g., the Internet, etc.), and the mobile device 102 can communicate with other devices or subsystems over the wide area network. In some instances, the wireless network system 103 can provide the mobile device 102 access to a telephone network (e.g., Integrated Services Digital Network (ISDN), Public Switched Telephone Network (PSTN), etc.), and the mobile device 102 can communicate with other devices or subsystems over the telephone network. The mobile device 102 may communicate over additional or different types of networks and may have other ways of accessing the other networks. Mobile devices can be configured to communicate over wireless Local Area Networks (WLANs), Personal Area Networks (PANs) (e.g., Bluetooth and other short-range communication systems), metropolitan area networks, public land mobile networks using cellular technology (e.g., Global System for Mobile Communication (GSM), Universal Mobile Telecommunication Services (UMTS), Long-Term Evolution (LTE), etc.), and other types of wireless networks.

The mobile device 102 includes a wireless interface 110, a processor 112, and a memory 114. The mobile device 102 can include additional or different features. In some instances, the mobile device 102 may include one or more user interfaces. For example, the user interface can include a touchscreen, a keyboard, a microphone, a pointing device (e.g., a mouse, a trackball, a stylus, etc.), or another type of user interface. Moreover, the features and components of the mobile device 102 can be configured as shown and described with respect to FIG. 1 or in a different manner. Generally, the mobile device 102 can include any appropriate types of subsystems, modules, devices, components, and combinations thereof. Examples of mobile devices include various types of mobile telecommunication devices, electronic readers, media players, smartphones, laptop systems, tablet devices, etc.

The wireless interface 110 of the mobile device 102 can include any suitable hardware, software, firmware, or combinations thereof. In some implementations, the wireless interface 110 can be included in a wireless communication subsystem of the mobile device 102. The wireless interface 110 may include additional or different features or components. In some implementations, the wireless interface 110 may include or have access to programs, codes, scripts, functions, or other types of instructions that can be executed by data processing apparatus. In some implementations, the wireless interface 110 may include or have access to pre-programmed or re-programmable logic circuits, logic gates, or other types of hardware or firmware components. The wireless interface 110 handles wireless communications between the mobile device 102 and the wireless station 104.

The processor 112 can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, the processor 112 can generate output data by executing or interpreting software, scripts, programs, functions, executable, or other modules stored in the memory 114.

The memory 114 can include any suitable computer-readable media. The memory 114 can include a volatile memory device, a non-volatile memory device, or both. The memory 114 can include one or more read-only memory devices, random-access memory devices, buffer memory devices, or a combination of these and other types of memory devices. In some instances, one or more components of the memory can be integrated or otherwise associated with another component of the mobile device 102. The memory 114 can store data, such as, for example, applications, files, etc. in a computer-readable format.

In some implementations, the mobile device 102 includes a universal integrated circuit card (UICC) and mobile equipment. The mobile equipment may be identified, for example, by an International Mobile Equipment Identity (IMEI). The UICC can be, for example, a SIM card that includes an International Mobile Subscriber Identity (IMSI), identifying the subscriber, a secret key for authentication, and other user information. The IMEI and the IMSI can be independent, thereby providing personal mobility. The SIM card may be protected against unauthorized use by a password, personal identity number, or otherwise.

The example wireless network system 103 shown in FIG. 1 can include one or more wireless telecommunication networks, wireless data networks, combined voice and data networks, or any suitable combination of these and other types of wireless networks. The wireless network system 103 can be a public land mobile network that uses cellular technology (e.g., Global System for Mobile Communication (GSM), Universal Mobile Telecommunication Services (UMTS), Long-Term Evolution (LTE), etc.). The wireless network system 103 can communicate with the mobile device 102, for example, by radio frequency signals or another mode of communication. The wireless network system 103 may include devices, systems, or components distributed across an area or region. The wireless network system 103 can include one or more local, regional, national, or global networks.

The wireless network system 103 can include one or more cellular networks. The wireless network system 103 may utilize one or more communication protocol standards, for example, 3G, 4G, GSM, LTE, CDMA, GPRS, EDGE, LTE, or others. In some cases, the wireless network system 103 is implemented as a UMTS system that uses wideband code division multiple access (WCDMA) as the air interface. Some example UMTS systems include a base station subsystem (BSS), a universal terrestrial radio access network (UTRN), and a core network for circuit switched and packet switched (e.g. email) applications.

The wireless station 104 can include any suitable structures or systems. In some cases, the wireless station 104 can be implemented as a base station, or a as part of a base station, in a cellular network. The wireless station 104 can communicate wirelessly with the mobile device 102. For example, the wireless station 104 may include one or more antennae that communicate directly with the mobile device 102 by radio frequency signals. The wireless station 104 may include any suitable communication components (e.g., antennas, antenna controller systems, transceivers, computing systems, processors, memory and associated hardware components). In some instances, all or part of the wireless station 104 can be implemented as a base station subsystem (BSS), a base transceiver station (BTS), a base station controller (BSC), a radio base station (RBS), a node B, an evolved node B, a Universal Terrestrial Radio Access Network (UTRAN), or any suitable combination of one or more of these. For example, a BSS may provide allocation, release and management of specific radio resources to establish connections between a mobile device 102 and a radio access network (e.g., a GSM/EDGE radio access network); a UTRAN may include, for example, radio network controllers (RNCs) and NodeBs, and the UTRAN may allow connectivity between the mobile device 102 and the core network system 106. The wireless station 104 may include additional or different features.

The wireless station 104 can communicate with the core network system 106, for example, by wired connections, wireless connections, or any suitable combination of communication links. The wireless station 104 may include features (e.g., hardware, software, data, etc.) adapted for communicating with the core network system 106. For example, the wireless station 104 may be adapted for encrypting, decrypting, and authenticating communications with the core network system 106.

The core network system 106 can include any suitable structures or systems. In some instances, the core network system 106 communicates with the wireless station 104 to control or facilitate communication between the wireless station 104 and the mobile device 102. In some instances, all or part of the core network system 106 can be implemented as a UMTS core network or another type of core network system. The core network system 106 may include any suitable server systems, communication interfaces, or other features. In some instances, the core network system 106 can communicate over a private data network (e.g., an enterprise network, a virtual private network, etc.), a wide area network (e.g., the Internet, etc.), a telephone network, and possibly additional or different types of networks.

In some implementations based on UMTS, the core network system 106 may include, for example, a mobile switching center (MSC), a visitor location register (VLR), a gateway MSC (GMSC), a signaling transfer point (STP), a service control point (SCP), an authentication center (AuC), home location register (HLR), a serving GPRS support node (SGSN), a gateway GPRS support node (GGSN), a short message service center SMS-SC, or a combination of these and other systems. The MSC can provide an interface between the radio system and fixed networks. For example the MSC may perform functions to handle circuit switched services to and from the mobile stations. The VLR can provide a database that stores information about mobile devices under the jurisdiction of an MSC that it serves. The HLR can support packet switched (PS) domain entities such as the SGSN, a mobile management entity (MME) and GGSN. The HLR can also support the circuit switched (CS) domain entities such as the MSC. In some instances, the HLR enables subscriber access to services and supports roaming to legacy GSM/UMTS networks. The AuC can store an identity key for each mobile subscriber registered with a home location register (HLR). This key can be used to generate security data. The core network system 106 may include additional or different features.

In some implementations based on UMTS, the HLR and VLR together with the MSC provide call routing and (possibly international) roaming capabilities for mobile devices. The HLR can contain administrative information of each subscriber registered in the UMTS network, along with the current location of mobile devices. A UMTS network may include a single HLR, and the HLR may be implemented as a distributed database. The VLR can contain selected administrative information from the HLR for call control and provision of the subscribed services, for each mobile currently located in the geographical area controlled by the VLR. Each functional entity can be implemented as an independent unit. Some manufacturers of switching equipment implement one VLR together with one MSC, so that the geographical area controlled by the MSC corresponds to that controlled by the VLR.

Figure 2:
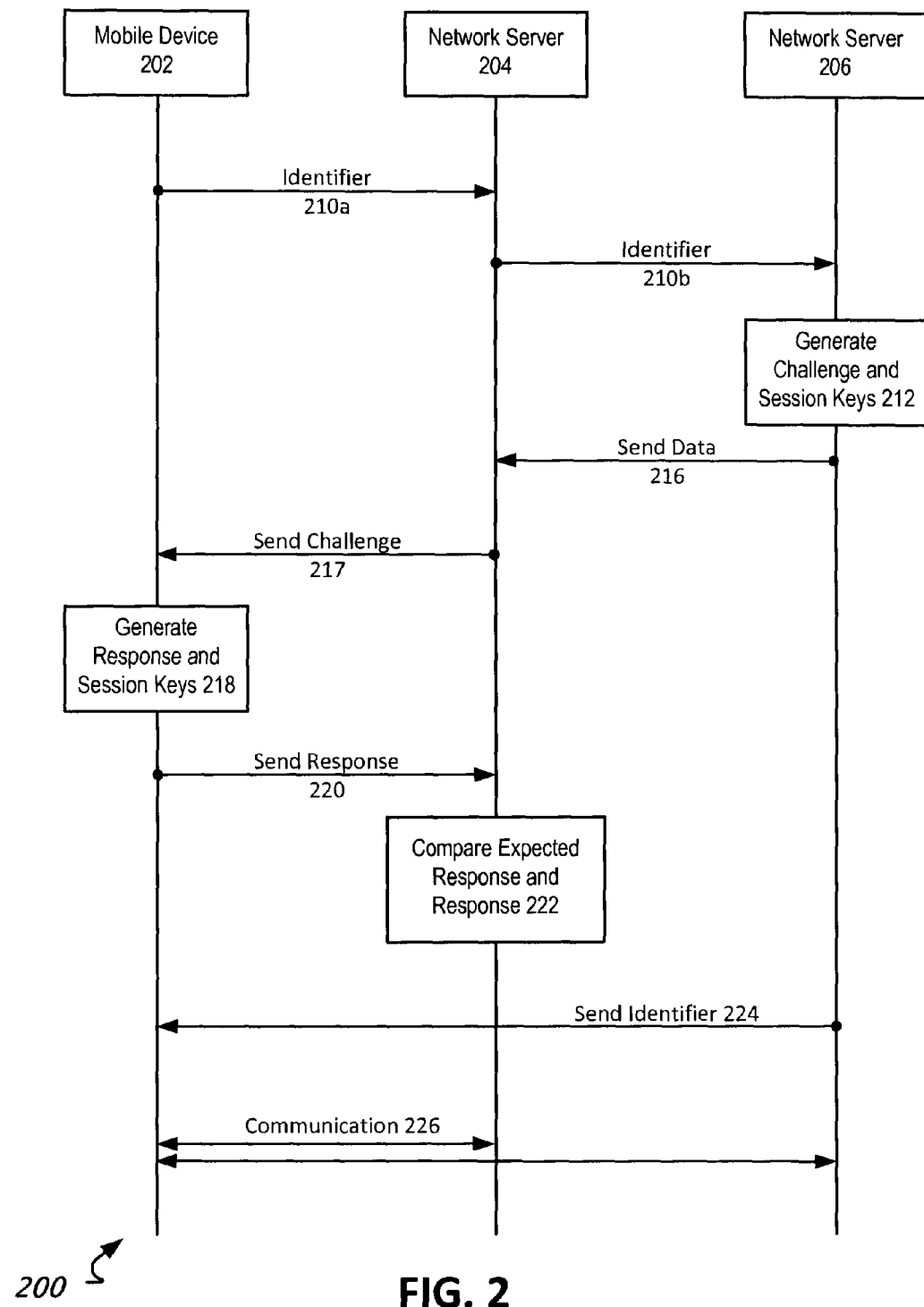
FIG. 2 is a signaling and flow diagram of an example authenticated key agreement sequence in a communication system.

FIG. 2 is a signaling and flow diagram of an example process 200 for authenticated key agreement in a communication system. The example process 200 shown in FIG. 2 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 2 can be executed as multiple separate operations, or one or more subsets of the operations shown in FIG. 2 can be combined and executed as a single operation.

The process 200 can be implemented in a communication system. For example, the process 200 can be implemented by one or more components of the wireless communication system 100 shown in FIG. 1 or by a different type of system. FIG. 2 shows certain operations being performed by a mobile device 202, a network server 204, and another network server 206. In some implementations of the process 200, one or more of the operations shown in FIG. 2 can be performed by additional or different components, devices, or subsystems, or by combinations of them, as appropriate.

The mobile device 202 can be any suitable device capable of wireless communication. In some aspects, the mobile device 202 can be the mobile device 102 shown in FIG. 1

For example, the mobile device 202 can be a mobile unit that allows a user to access network services through network servers 204 or 206. The network servers 204 and 206 can be associated with a wireless network system, such as the wireless network system 103 shown in FIG. 1. For example, one or both of the network servers 204 and 206 can be part of the wireless station 104, the core network system 106, or the network servers 204 and 206 may be associated with other features of a wireless network system.

The network server 204 can be any suitable computing system that is capable of communicating (e.g., directly, indirectly, wirelessly, etc.) with the mobile device 202 and the network server 206. In some implementations, the network server 204 can be a visitor location register (VLR), which can be part of a core network. For example, the network server 204 may be configured to perform the functions of detailed location information update, location information registration, paging, security for the mobile device, and can maintain a copy of the subscriber information. In some implementations, the network server 204 can assign a temporary mobile subscriber identity (TMSI) which can have local significance in the area handled by the VLR. For example, the TMSI may be assigned randomly by the AuC. The network server 204 can be implemented in another manner, and it may be configured to perform additional or different operations.

The network server 206 can be any suitable computing system that is capable of communicating (e.g., directly, indirectly, wirelessly, etc.) with the network server 204 and the mobile device 202. In some implementations, the network server 206 can be a home location register (HLR), which can be part of a core network. The network server 206 can be implemented in another manner, and it may be configured to perform additional or different operations. In some implementations, the mobile device 202 has a subscription to the wireless network system and can be registered with the network server 204. In some implementations, the mobile device 202 can be a visiting mobile device with a subscription to another wireless network system, and the visiting mobile device can temporarily register with its HLR (e.g., the network server 206) through a VLR (e.g., the network server 204).

The process 200 can be executed at any suitable time or upon any suitable condition. The process 200 may be performed, for example, when the mobile device 202 enters the jurisdiction of a particular wireless station, when the mobile device 202 initiates communication with a wireless station, when a wireless station initiates communication with the mobile device 202, or upon other events. In some cases, the process 200 can be performed periodically, for example, at specified times or at specified time intervals. In some cases, the process 200 can be performed when the mobile device 202 or the wireless network refreshes communication parameters, or at other specified instances.

At 210a, the mobile device 202 sends an identifier to the network server 204. The mobile device 202 can transmit the identifier over the wireless network or by additional or different communication systems or links. In some implementation, the identifier can be a temporary mobile subscriber identity (TMSI). The TMSI can be a unique identifier assigned to the mobile device 202 by a network server to identify the mobile device 202, while supporting subscriber identity. At 210b, the network server 204 sends the identifier to the network server 206. In certain instances, the identifier can be the identifier received from the mobile device 202 at 210a. One of the possible reasons for sending the identifier is to request verification of the identifier from the network server 206.

At 212, the network server 206 generates a challenge and session keys. In some instances, the example processes shown in FIGS. 3A, 4A, 5A, 5B, and 6A can be used to generate the challenge and the sessions keys. Other suitable techniques may be used to generate a challenge and session keys. In some implementations, the network server 206 participates in the authentication and key agreement process to generate an authentication vector AV. The authentication vector can include, for example, a random value RAND, expected response XRES, cipher key CK, integrity key IK and authentication token AUTN. Each authentication vector may be valid for only one authentication and key agreement between the network server 206 and the mobile device 202 and can be ordered based on a sequence number. Additional or different types of data may be generated by the network server 206.

At 216, the network server 206 sends data to the network server 204. The data can include, for example, an authentication vector or any suitable information. In some instances, the data include a random value RAND, an expected response XRES, a cipher key CK, an integrity key IK, an authentication token AUTN, or any suitable combination of values produced by the network server 206 in response to receiving the identifier.

At 217, the network server 204 sends a challenge to the mobile device 202. In some implementations, the network server 204 can facilitates an authenticated key agreement process by parsing the data and sending it to the mobile device 202. The challenge sent to the mobile device 202 can include the random value RAND, the authentication token AUTN, or a combination of these and other data.

At 218, the mobile device 202, generates a response and session keys. In some instances, the example processes shown in FIGS. 3B, 4B, 5C, 5D, 6B and 6C can be used to generate the response and the sessions keys. Other suitable techniques may be used to generate a challenge and session keys. On receiving the challenge, if the authentication token AUTN is accepted by the mobile device 202, the mobile device 202 can generate the response RES, the cipher key CK, the integrity key IK and a mobile device authentication token $AUTN_{MS}$. Additional or different types of data may be generated by the mobile device 202.

At 220, the mobile device 202 sends the response to the network server 204. The response can include the response RES generated by the mobile device 202. The response may include additional or different data, as appropriate.

At 222, the network server 204 compares the expected response XRES provided by the network server 204 and the response RES provided by the mobile device 202. If the response and the expected response match, the network server 204 can consider the authentication and key agreement to be successfully completed between the mobile device 202 and the network server 206. If the response and the expected response do not match, the network server 204 can consider the authentication and key agreement to have failed. In such instances, one or more of the prior operations can be repeated, the process can be terminated, or other options may be available.

At 224, the network server 206 sends an identifier to the mobile device 202. The identifier can be sent through the network server 204 or through another communication link or intermediate system. The identifier can be the TMSI or another identifier. In some cases, the identifier may be encrypted, or the identifier may be unencrypted. In some instances, the identifier is sent to the mobile device before the other operations shown in FIG. 2.

At 226, a secure communication channel is utilized between the mobile device one or more of the network servers 204, 206. The channel can be made secure, for example, using the session keys generated at 212 and 218. In some implementations, the mobile device 202 or the network server uses the session keys to communicate with each other or with other entities. In some instances, the mobile device 202 or the network server encrypts or decrypts communications using the ciphering key CK. In some instances, the mobile device 202 or the network server generates an authentication tag or verify authenticity of an authentication tag using the integrity key IK. Additional or different security procedures may be used. In some instances, an anonymity key AK* may be used to protect information, for example, to send a resynchronized sequence value SQN to the AuC. In some instances, the anonymity key is used to mask the sequence value SQN, as the sequence value SQN can be used for tracking. The anonymity key AK may computed, for example, from the key K and the value RAND or in any other suitable manner.

Figure 3A:
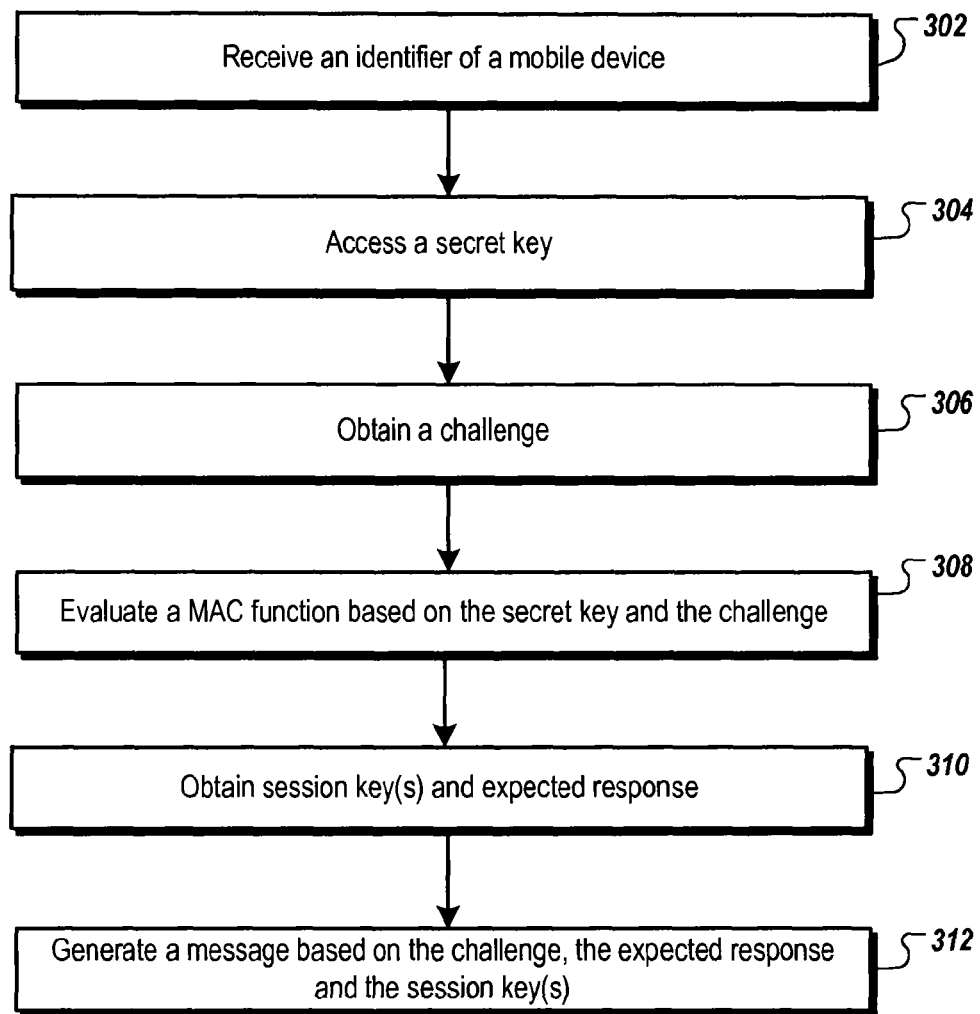
FIG. 3A is a flow diagram showing an example technique that can be used by a network operator system for authenticated key agreement.

FIG. 3A is a flow diagram showing an example process 300 that can be used by a network operator system for authenticated key agreement. The process 300 may be implemented, for example, by a server system of a wireless network or by any other suitable system. In some implementations, one or more operations of the process 300 are performed by a home location register (HLR) or by any other component of the wireless network. The process 300 can include additional or different operations, and the operations can be performed in the order shown in FIG. 3A or any suitable order. In some cases, one or more of the operations can be iterated or repeated, for example, until a specified condition is reached.

At 302, an identifier of a mobile device is received. For instance, the identifier can be a temporary mobile subscriber identity (TMSI) or any other suitable identifier associated with a mobile device. In some implementations, the identifier may be affiliated with an identity in a layer of the Open Systems Interconnection (OSI) model (e.g., an email address, a telephone number, a Session Initiation Protocol (SIP), Uniform Resource Identifier (URI), a media access control identifier, etc.). The identifier can be received directly or indirectly from the mobile device. For example, the mobile device may wirelessly transmit the identifier to the wireless network, and the identifier may be forwarded through one or more communication links in the core network system.

At 304, a secret key is accessed. For example, the secret key can be stored in any suitable database or network server of the core network. The identifier received at 302 can be used to locate the secret key, for example, in a secure database. In some instances, the secret key is a long-term, symmetric key held by both the mobile device and the network operator. Additional or different types of secret keys may be used.

At 306, a challenge is obtained. For instance, the challenge can be a random challenge value. The random value can be a previously-generated random value, or the random value can be generated in response to receiving the identifier. Random values can be generated, for example, by a pseudorandom generator or another suitable system. In some cases, the challenge can be updated by XORing the random challenge with an operator constant.

At 308, a message authentication code (MAC) function is evaluated based on the secret key and the challenge. The MAC function can include any suitable function or family of functions. For example, the MAC function can be a hashed-MAC (HMAC), a cipher-MAC (CMAC), or any other suitable MAC function. The MAC function can be evaluated as a stand-alone function, or the MAC function can be evaluated as part of a larger function (e.g., as part of a key derivation function). Some key derivation functions (KDFs) include MAC functions, and evaluating such KDFs causes a MAC function to be evaluated. Examples of KDFs that include MAC functions include the hash-based KDF using SHA256 defined in ANSI X9.63-2011, the counter-mode KDF defined in NIST SP800-108 with CMAC-AES128 from NIST SP800-38B, the NIST counter-mode KDF defined in NIST SP800-108 with keyed-HMAC-SHA256 from FIPS 198-1, and others. The MAC function may operate on any suitable inputs. In some examples, the inputs to the MAC function may include the secret key and the challenge value. Additional or different inputs may be used, as appropriate.

At 310, session key(s) and an expected response are obtained based on the output of the MAC function. For instance, the session keys can include one or both of the ciphering key (CK) and the integrity key (IK). Additional or different session keys can be generated. The expected response can be the response that the mobile device is expected to generate in response to the challenge value obtained at 306. As such, the challenge and the expected response can be used to authenticate the mobile device.

At 312, a message is generated based on the challenge, the expected response and the session key(s). For instance, the message can include the challenge, the expected response, the session keys (e.g., CK, IK, or other session keys), an authentication token (AUTN), or any suitable combination of these and other data. The message can have any suitable structure or format. The message can be structured as an ordered array or an authentication vector, which can be sent from an HLR to a VLR. In some cases, AUTN can be assembled by concatenating a sequence number SQN, an authentication management function (AMF), and a message authentication code. In addition, an anonymity key can also be part of the AUTN. In some cases, the anonymity key AK can be masked with SQN. For example, $SQN^{AK}$ may be sent as part of AUTN.

Figure 3B:
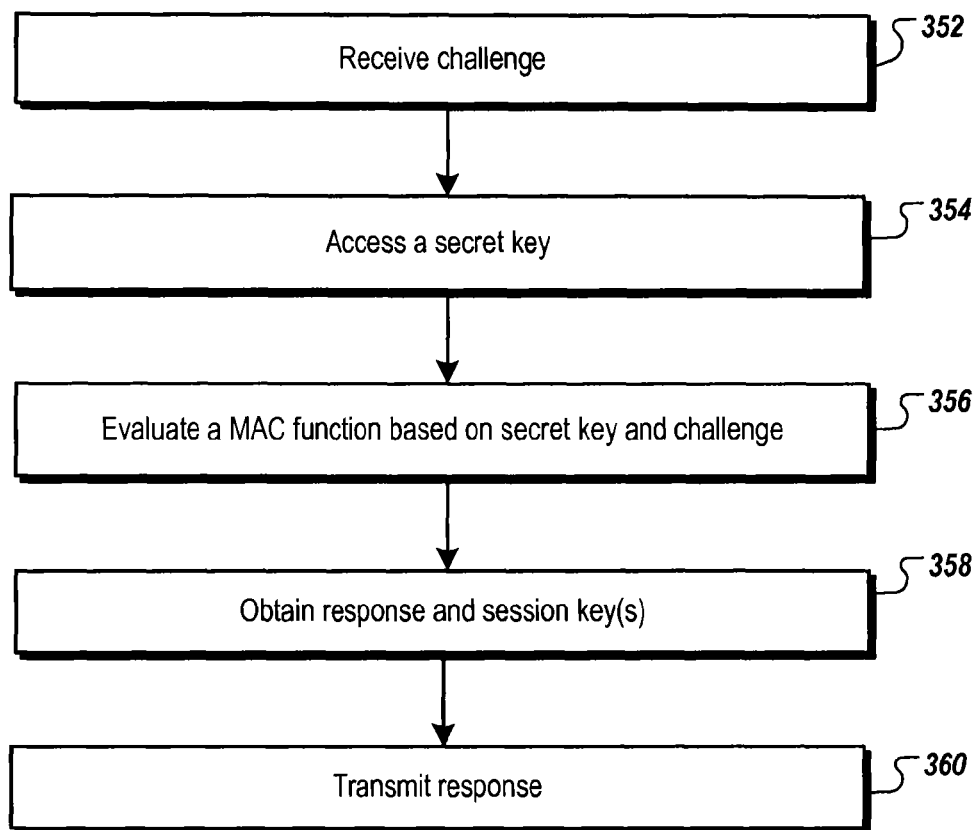
FIG. 3B is a flow diagram showing an example technique that can be used by a mobile device for authenticated key agreement.

FIG. 3B is a flow diagram showing an example process 350 that can be used by a mobile device for authenticated key agreement. The process 350 may be implemented, for example, by a mobile device in a wireless communication system or by any other suitable system. In some implementations, the example process 350 shown in FIG. 3B is performed by a mobile device in coordination with a wireless network server performing the example process 300 shown in FIG. 3A. The process 350 can include additional or different operations, and the operations can be performed in the order shown in FIG. 3B or any suitable order. In some cases, one or more of the operations can be iterated or repeated, for example, until a specified condition is reached.

At 352, a challenge is received. The challenge can be received from the wireless network system. For example, the VLR or another component of the wireless network system may send the challenge to the mobile device to initiate an authenticated key agreement protocol. The challenge can include a random value, an authentication token, or any suitable combination of these and other data. In some instances, the challenge can include the challenge value produced by the network operator at 306 in FIG. 3A. For example, the challenge can include data from the message generated by a network operator at 312 in FIG. 3A.

At 354, a secret key is accessed. The secret key can be accessed by any suitable technique. The secret key can be accessed locally on the mobile device in response to receiving the challenge from the wireless network. The secret key can be a previously-computed key held by the mobile device and a network operator. For instance, the secret key can be a long-term symmetric key stored on a USIM of a mobile device. In some cases, other types of keys may be used.

At 356, a MAC function is evaluated based on the secret key and the challenge. The MAC function evaluated by a mobile device at 356 can be the same MAC function evaluated by a network server at 308. For example, the MAC function can be a hashed-MAC (HMAC), a cipher-MAC (CMAC), or any other suitable MAC function. The MAC function can be evaluated as a stand-alone function, or the MAC function can be evaluated as part of a larger function (e.g., as part of a key derivation function). Some key derivation functions (KDFs) include MAC functions, and evaluating such KDFs causes a MAC function to be evaluated.

At 358, a response and session key(s) are obtained based on the output of the MAC function. For instance, the session keys can include one or both of the ciphering key (CK) and the integrity key (IK). Additional or different session keys can be generated. The response can include information that the mobile device will proffer in response to the challenge value received at 352. For example, the mobile device can send the response to the network, and the network can use the response to authenticate the mobile device.

At 360, the response is transmitted. The response may be wirelessly transmitted from the mobile device to the wireless network system. For example, the response may be sent to the network system that provided the challenge at 352. In some cases, the response may be sent to the VLR or another component of the wireless network system. In some cases, the response can be sent with an authentication token and other data, as appropriate.

Figure 4A:
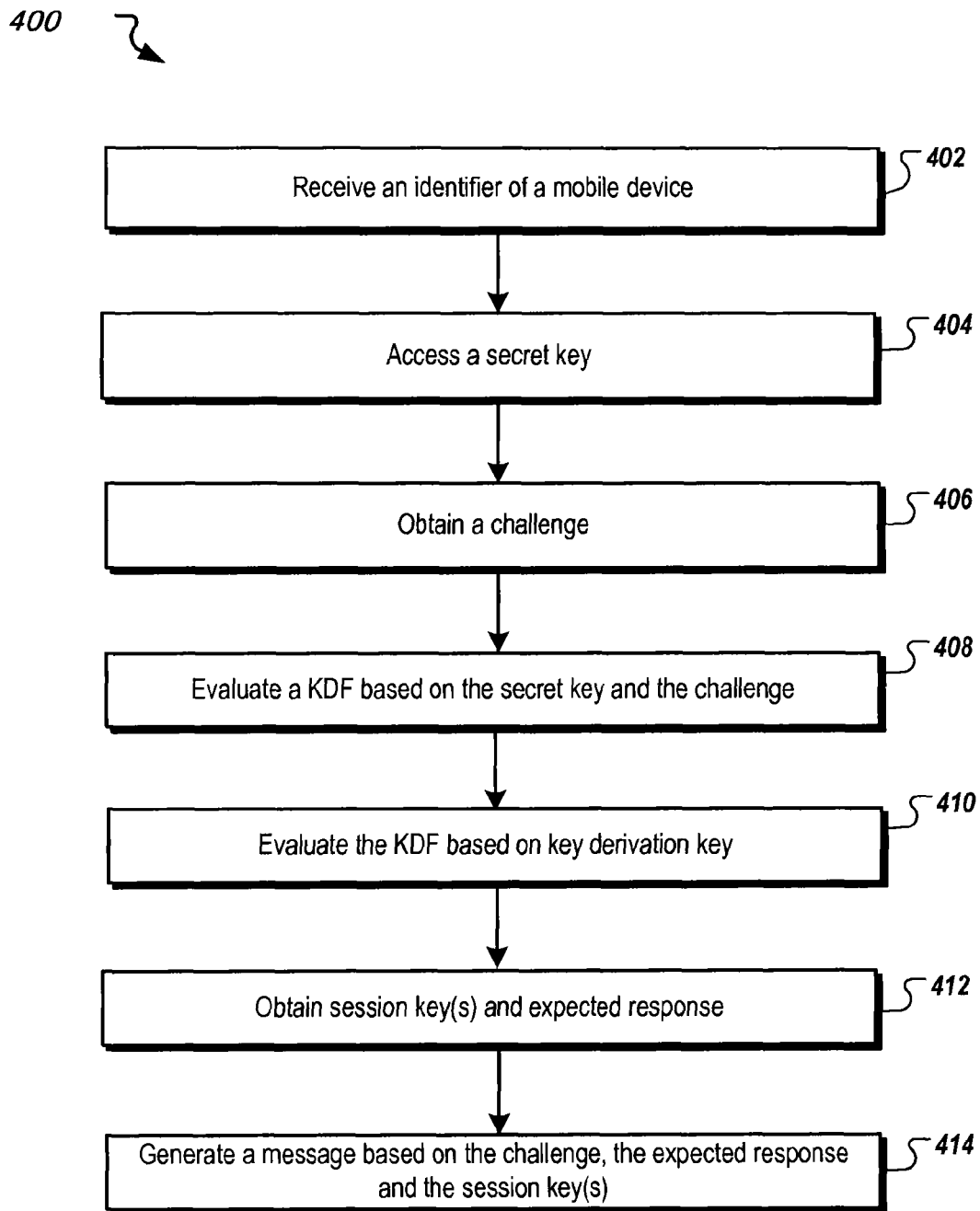
FIG. 4A is a flow diagram showing an example technique that can be used by a network operator system for authenticated key agreement.

FIG. 4A is a flow diagram showing an example process 400 that can be used by a network operator system for authenticated key agreement. The process 400 may be implemented, for example, by a server system of a wireless network or by any other suitable system. In some implementations, one or more operations of the process 400 are performed by a home location register (HLR) or by another component of the wireless network. The process 400 can include additional or different operations, and the operations can be performed in the order shown in FIG. 4A or any suitable order. In some cases, one or more of the operations can be iterated or repeated, for example, until a specified condition is reached.

At 402, an identifier of a mobile device is received. For instance, the identifier can be a temporary mobile subscriber identity (TMSI) or any other suitable identifier associated with a mobile device. In some implementations, the identifier may be affiliated with an identity in a layer of the Open Systems Interconnection (OSI) model (e.g., an email address, a telephone number, a Session Initiation Protocol (SIP), Uniform Resource Identifier (URI), a media access control identifier, etc.). The identifier can be received directly or indirectly from the mobile device. For example, the mobile device may wirelessly transmit the identifier to the wireless network, and the identifier may be forwarded through one or more communication links in the core network system.

At 404, a secret key is accessed. For example, the secret key can be stored in any suitable database or server of the core network. The identifier received at 302 can be used to locate the secret key, for example, in a secure database. In some instances, the secret key is a long-term, symmetric key held by both the mobile device and the network operator. Additional or different types of secret keys may be used.

At 406, a challenge is obtained. For instance, the challenge can be a random challenge value. The random value can be a previously-generated random value, or the random value can be generated in response to receiving the identifier. Random values can be generated, for example, by a pseudorandom generator or another suitable system. In some cases, the challenge can be updated by XORing the random challenge with an operator constant.

At 408, a key derivation function KDF is evaluated based on the secret key and the challenge. The KDF can include any suitable function or family of functions. The KDF can include a MAC function, a hash function or another type of one-way function, an encryption function, or any suitable combination of these and other functions. Example KDFs include the hash-based KDF using SHA256 defined in ANSI X9.63-2011, the counter-mode KDF defined in NIST SP800-108 with CMAC-AES128 from NIST SP800-38B, and the NIST counter-mode KDF defined in NIST SP800-108 with keyed-HMAC-SHA256 from FIPS 198-1. Additional or different KDFs may be used.

The KDF evaluated at 408 may operate on any suitable inputs. In some examples, the inputs to the KDF include the secret key and the challenge value. Additional or different inputs may be used, as appropriate. The KDF may operate on an input that specifies the length of the keying material to be derived by the KDF. Evaluating the KDF at 408 can produce a key derivation key as output.

At 410, the key derivation function is evaluated based on the key derivation key. As such, a tiered approach to key derivation can be used. For instance, the key derivation key produced at 408 can be used as one of the inputs to the KDF to generate another KDF output at 410. The KDF evaluated at 410 can be the same KDF that was evaluated at 408, or a different KDF can be used. In either case, the bit-length of the output produced by the KDF at 408 can be greater than, equal to, or less than the bit-length of the output produced by the KDF at 410. For example, different output length variables may be used with the same KDF. The KDF evaluated at 410 may operate on any suitable inputs. In some examples, the inputs to the KDF include the key derivation key and a constant. Additional or different inputs may be used, as appropriate.

At 412, session key(s) and an expected response are obtained based on the output produced by the KDF at 410. For instance, the session keys can include one or both of the ciphering key (CK) and the integrity key (IK). Additional or different session keys can be generated. The expected response can be the response that the mobile device is expected to generate in response to the challenge value obtained at 406. As such, the challenge and the expected response can be used to authenticate the mobile device.

At 414, a message is generated based on the challenge, the expected response and the session key(s). For instance, the message can include the challenge, the expected response, the session keys (e.g., CK, IK, or other session keys), an authentication token (AUTN), or any suitable combination of these and other data. The message can have any suitable structure or format. The message can be structured as an ordered array or an authentication vector, which can be sent from an HLR to a VLR. In some cases, AUTN can be assembled by concatenating a sequence number SQN, an authentication management function (AMF), and a message authentication code. In addition, an anonymity key can also be part of the AUTN.

Figure 4B:
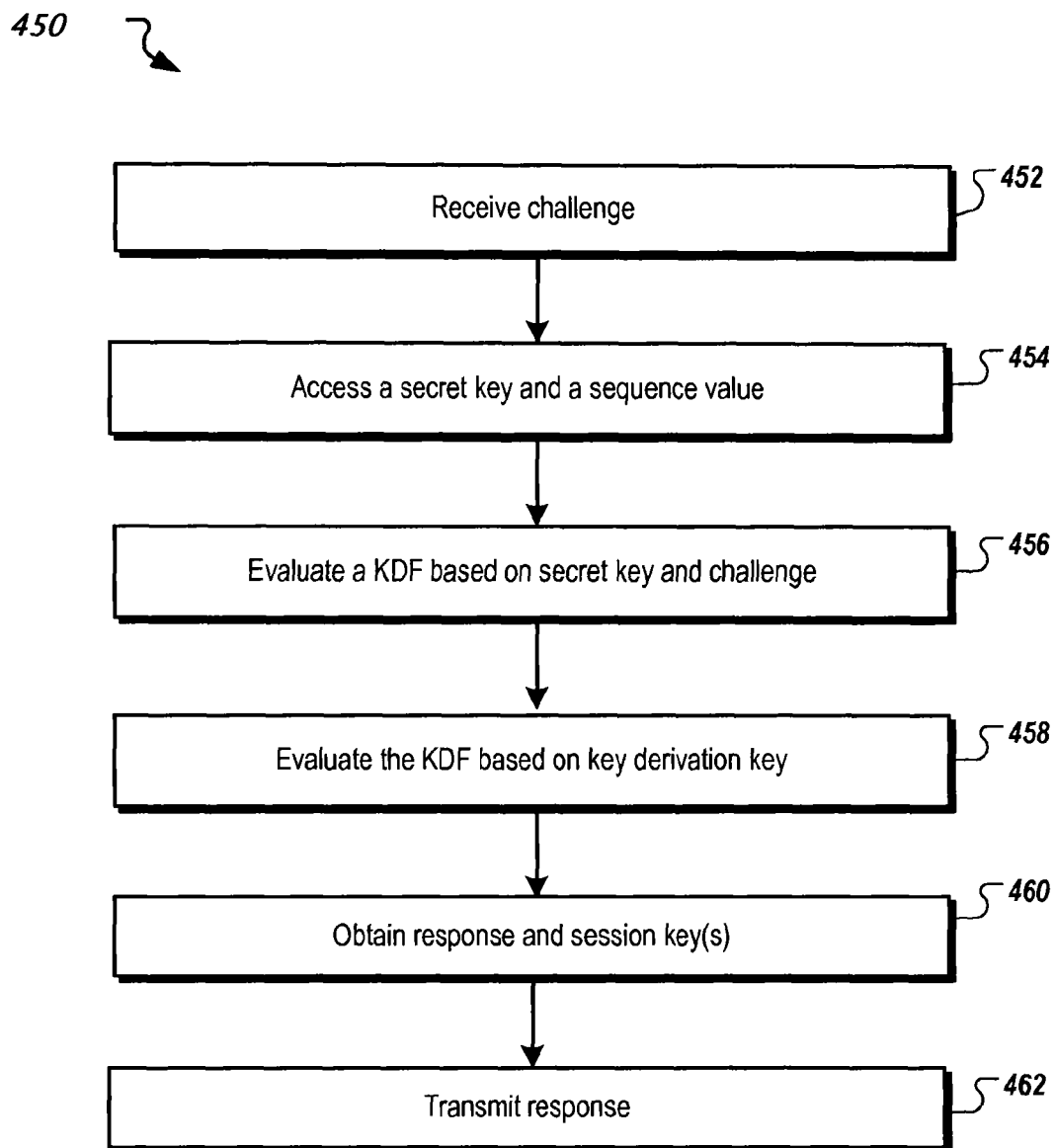
FIG. 4B is a flow diagram showing an example technique that can be used by a mobile device for authenticated key agreement.

FIG. 4B is a flow diagram showing an example process 450 that can be used by a mobile device for authenticated key agreement. The process 450 may be implemented, for example, by a mobile device in a wireless communication system or by any other suitable system. In some implementations, the example process 450 shown in FIG. 4B is performed by a mobile device in coordination with a wireless network server performing the example process 400 shown in FIG. 4A. The process 450 can include additional or different operations, and the operations can be performed in the order shown in FIG. 4B or any suitable order. In some cases, one or more of the operations can be iterated or repeated, for example, until a specified condition is reached.

At 452, a challenge is received. The challenge can be received from the wireless network system. For example, the VLR or another component of the wireless network system may send the challenge to the mobile device to facilitate an authenticated key agreement protocol. The challenge can include a random value, an authentication token, or any suitable combination of these and other data. In some instances, the challenge can include the challenge value produced by the network operator at 406 in FIG. 4A. For example, the challenge can include data from the message generated by a network operator at 414 in FIG. 4A.

At 454, a secret key is accessed. The secret key can be accessed by any suitable technique. The secret key can be accessed locally on the mobile device in response to receiving the challenge from the wireless network. The secret key can be a previously-computed key held by the mobile device and a network operator. For instance, the secret key can be a long-term symmetric key stored on a USIM of a mobile device. In some cases, other types of keys may be used.

At 456, a key derivation function (KDF) is evaluated based on the secret key and the challenge. Evaluating the KDF at 456 produces a key derivation key. At 458, a KDF is evaluated based on the key derivation key. The KDFs evaluated by a mobile device at 456 and 458 can be the same KDFs evaluated by a network server at 408 and 410, respectively. For example, the KDF evaluated at 456 and 458 can be the hash-based KDF using SHA256 defined in ANSI X9.63-2011, the counter-mode KDF defined in NIST SP800-108 with CMAC-AES128 from NIST SP800-38B, the NIST counter-mode KDF defined in NIST SP800-108 with keyed-HMAC-SHA256 from FIPS 198-1, or any other suitable KDF.

At 460, a response and session key(s) are obtained based on the output of the KDF evaluated at 458. For instance, the session keys can include one or both of the ciphering key (CK) and the integrity key (IK). Additional or different session keys can be generated. The response can include information that the mobile device will proffer in response to the challenge value received at 452. For example, the mobile device can send the response to the network, and the network can use the response to authenticate the mobile device.

At 462, the response is transmitted. The response may be wirelessly transmitted from the mobile device to the wireless network system. For example, the response may be sent to the network system that provided the challenge at 452. In some cases, the response may be sent to the VLR or another component of the wireless network system. In some cases, the response can be sent with an authentication token and other data, as appropriate.

Figure 5A:
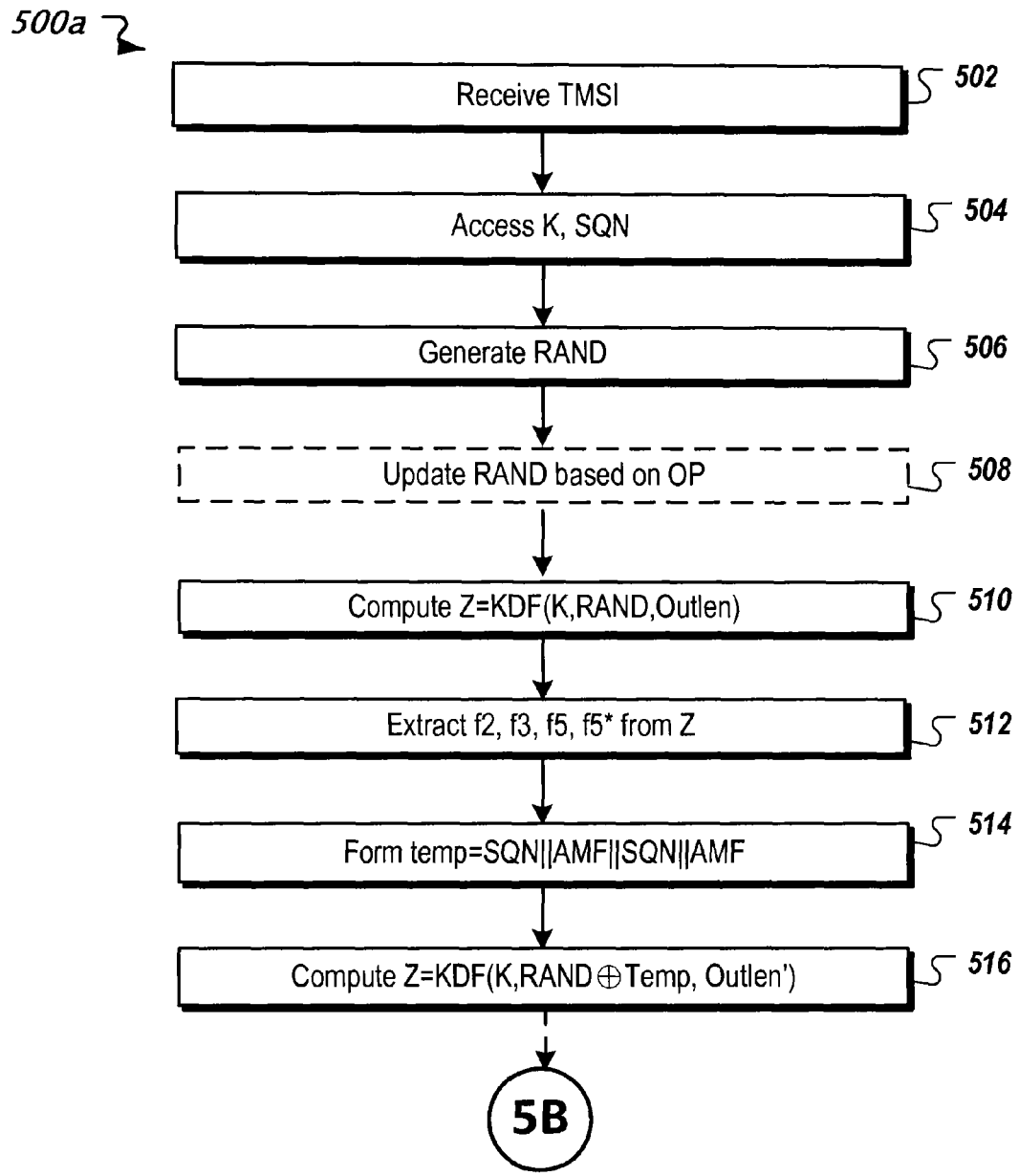
FIGS. 5A and 5B are flow diagrams showing an example technique that can be used by a network operator system for authenticated key agreement in a Universal Mobile Telecommunication Services (UMTS) system.
Figure 5B:
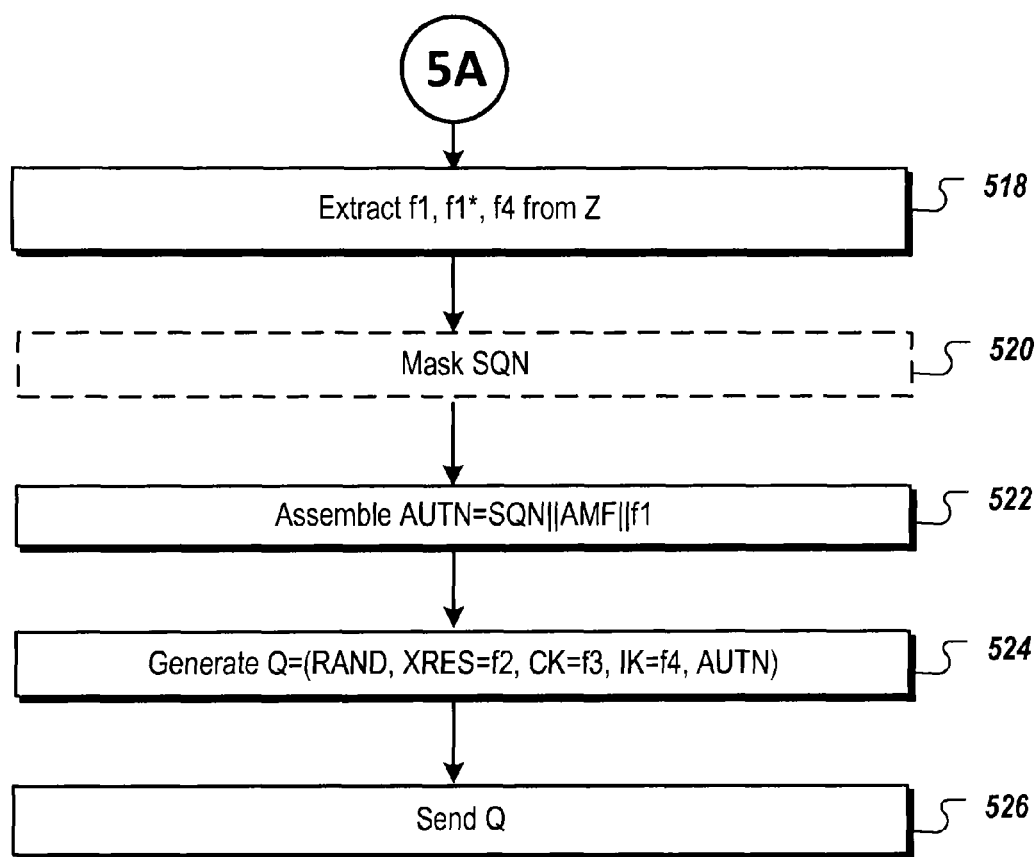

FIGS. 5A and 5B are flow diagrams showing an example process 500 that can be used by a network operator system for authenticated key agreement in a UMTS system. The process 500 may be implemented, for example, by a server system of a wireless network or by any other suitable system. In some implementations, one or more operations of the process 500 are performed by a home location register (HLR) or by another component of the wireless network. The process 500 can include additional or different operations, and the operations can be performed in the order shown in FIGS. 5A and 5B or any suitable order. In some cases, one or more of the operations can be iterated or repeated, for example, until a specified condition is reached.

At 502, a temporary mobile subscriber identity (TMSI) is received. The TMSI is associated with a mobile device. The TMSI can be received from the mobile device or from an entity in the wireless network system. For example, the HLR may receive the TMSI from a visitor location register (VLR) or from another component of the wireless network system. In some implementations, the mobile device wirelessly transmits the TMSI to the network, and the VLR forwards the TMSI to the HLR to authenticate the mobile device.

At 504, a key K and a sequence value SQN are accessed. The key K and the sequence value SQN are associated with the TMSI received at 502, and they may be accessed based on the TMSI. The key K and the sequence value SQN corresponding to the TMSI may be accessed in any suitable manner. For example, the HLR may access the key K and the sequence value SQN by searching a database for a record corresponding to the TMSI.

At 506, a random value RAND is generated. The random value RAND can be generated by any suitable technique. In some cases, the HLR can access a database of previously-generated random values, or the HLR may include a pseudorandom generator that generates random values as needed. The random value can be any suitable size or data format (e.g., binary, etc.).

At 508, the random value RAND may be updated. If the operator is using an operator constant OP, then $OP_c$ is computed. The value $OP_c$ can be used to update RAND, for example, by computing RAND=RAND$\oplus OP_c$. The value $OP_c$ may be computed by evaluating $OP_c$=KDF(K, OP, klength), where KDF represents a key derivation function. The inputs to KDF include OP (a 128-bit operator variant algorithm configuration field), K (a long-term secret key) and klength (a key length variable). In addition, $OP_c$ can be a 128-bit value derived from OP and K. The value $OP_c$ can be used within the computations of f1, f1*, f2, f3, f4, f5 and f5*. The value f1 can represent an output of a message authentication code function. The value f2 can represent an output of a message authentication code function used to compute a response (RES) and an expected response (XRES). The value f3 can represent an output of a key generating function used to compute a cipher key (CK). The value f4 can represent an output of a key generating function used to compute an integrity key (IK). The value f5 can represent an output of a key generating function used to compute the anonymity key AK.

At 510, a value Z is computed. The value Z can be computed by evaluating Z=KDF(K, RAND, outlen). Here, the inputs to KDF can include the key K, the random value RAND and outlen, where outlen represents the sum of bit-lengths needed for f2, f3, f5 and f5*. The function KDF can be any key derivation function that accepts an input key and other input data to derive keying material. Example KDFs include the hash-based KDF using SHA256 defined in ANSI X9.63-2011, the counter-mode KDF defined in NIST SP800-108 with CMAC-AES128 from NIST SP800-38B, and the NIST counter-mode KDF defined in NIST SP800-108 with keyed-HMAC-SHA256 from FIPS 198-1. Additional or different KDFs may be used.

At 512, f2, f3, f5 and optionally f5* are extracted from Z. For instance, the extraction process can include parsing Z or any other suitable technique.

At 514, temp=SQN∥AMF∥SQN∥AMF is formed. For instance, temp can be assembled by concatenating SQN and AMF. In some instances, the concatenation is done twice. Here, SQN is a sequence number that can be kept synchronized by the mobile device and the HLR. In addition, AMF represents the Authentication Management Field. Example uses of AMF may include support for multiple authentication algorithms and keys, changing list parameter and setting threshold values to restrict the lifetime of cipher and integrity keys.

At 516, a new value of Z is computed. The new value can be computed by evaluating Z=KDF(K, RAND⊕temp, outlen'). Here, the inputs to the KDF can include the key K, the random value RAND XORed with temp, and outlen. The value outlen can represent the sum of bit-lengths for f1, f1* and f4. The value temp can be the concatenation of SQN and AMF produced at 514.

At 518, f1, f1* and f4 are extracted from Z. For instance, the extraction process can include parsing Z or any other suitable technique.

At 520, if masking is used, the sequence value SQN can be masked. For example, the sequence value can be masked by computing SQN=SQN⊕f5. For each mobile device, the authentication center (AuC) can keep track of the sequence value SQN, which can facilitate re-synchronization. Sequence masking can be done, for example, while provisioning non-production environments so that copies created to support test and development processes are not exposing sensitive information and thus avoiding risks of leaking. Masking algorithms can be designed to be repeatable so referential integrity is maintained.

At 522, the authentication token AUTN is assembled. Here, the authentication token AUTN can be assembled by forming AUTN=SQN∥AMF∥f1 (=$MAC_A$). For instance, AUTN can be assembled by the concatenation of the sequence number SQN, authentication management field AMF and the value f1. The value of f1 can be the message authentication code $MAC_A$.

At 524, an output quintet Q is generated. Here, the output quintet can be generated by forming Q=(RAND, XRES=f2, CK=f3, IK=f4, AUTN). For instance, Q can be an ordered array of authentication vector that can include a random number RAND, an expected response XRES, a cipher key CK, an integrity key IK and authentication token AUTN. In some cases, the quintet Q is valid for an authentication and key agreement between the VLR and the mobile device.

At 526, the output quintet Q is sent. The output quintet Q can be sent, for example, by the HLR to the VLR. The output quintet Q can be sent in any suitable form or format, using any suitable transmission technique. Subsequently, the VLR can extract RAND and AUTH and may forward these variables to the mobile device.

Figure 5C:
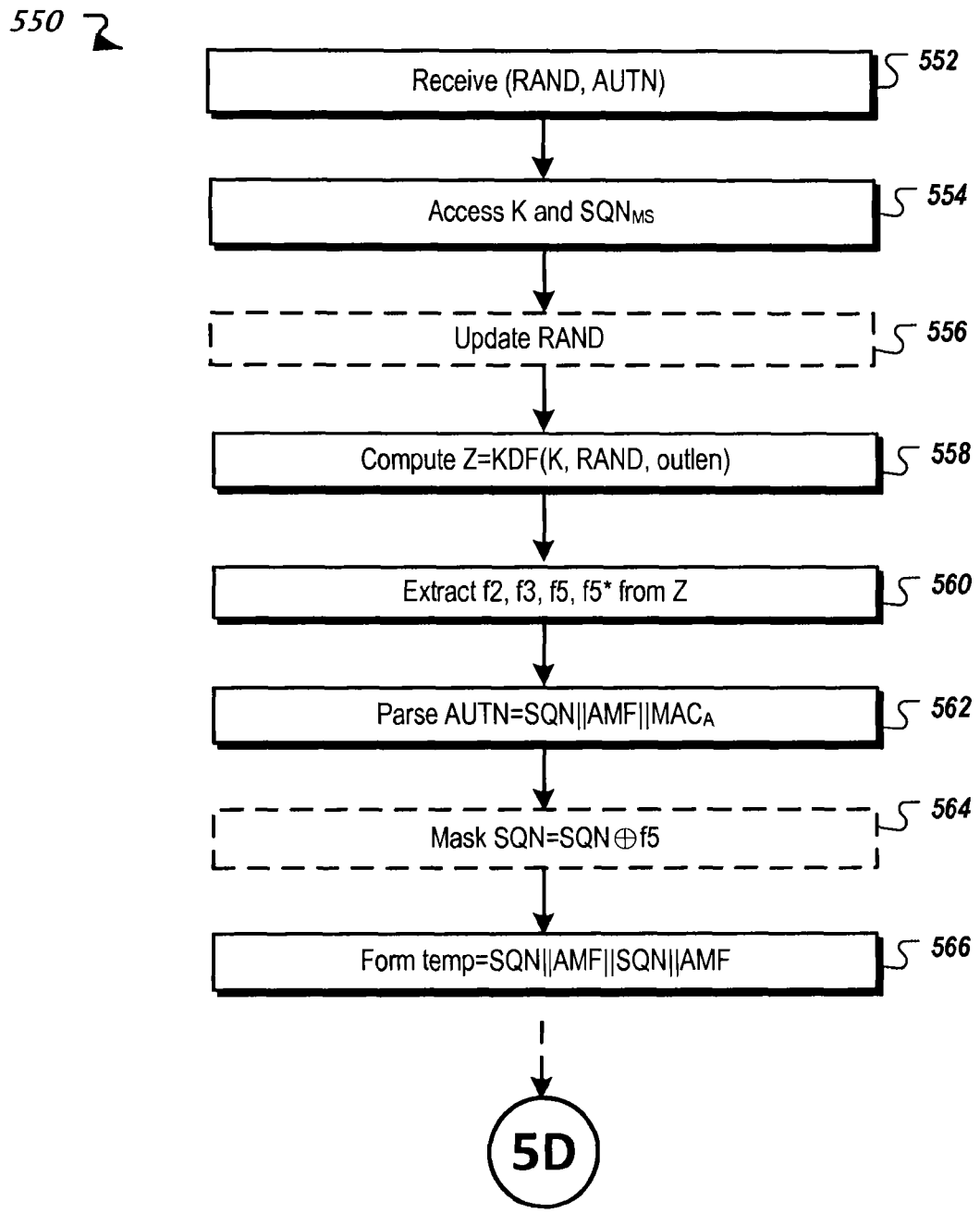
FIGS. 5C and 5D are flow diagrams showing example technique that can be used by a mobile device for authenticated key agreement in a UMTS system.
Figure 5D:
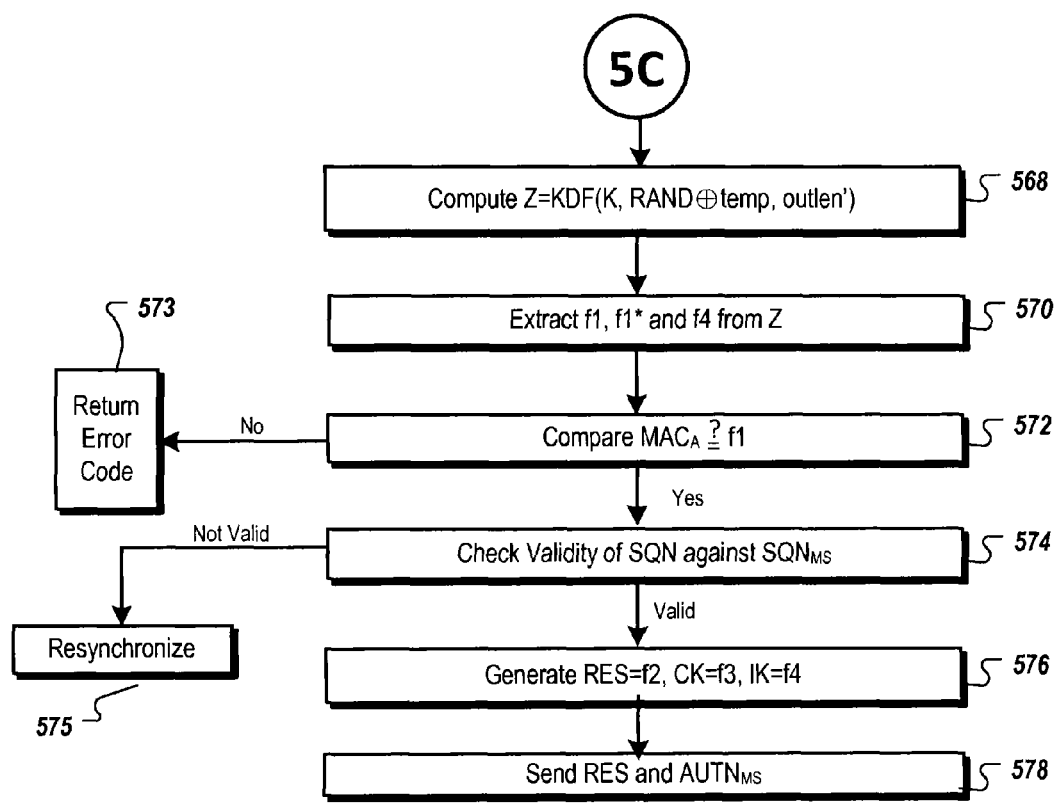

FIGS. 5C and 5D are flow diagrams showing an example process 550 that can be used by a mobile device for authenticated key agreement in a UMTS system. The process 550 may be implemented, for example, by a mobile device in a wireless communication system or by any other suitable system. In some implementations, the example process 550 shown in FIGS. 5C and 5D is performed by a mobile device in coordination with a wireless network server performing the example process 500 shown in FIGS. 5A and 5B. The process 550 can include additional or different operations, and the operations can be performed in the order shown in FIGS. 5C and 5D or any suitable order. In some cases, one or more of the operations can be iterated or repeated, for example, until a specified condition is reached.

At 552, a random value RAND and an authentication token AUTN are received. The values may be received wirelessly by the mobile device from the wireless network. In some cases, RAND and AUTN can be sent to the mobile device by a VLR or another component of the wireless network system. In some cases, the random value RAND and the authentication token AUTN are the values generated by a network operator in the process 500 (e.g., at 506 or 508, 522) shown in FIGS. 5A and 5B. For example, the VLR may parse the random value RAND and authentication token AUTN from the authentication vector AV sent to the VLR from the HLR, and the VLR may forward the parsed values to the mobile device for authentication.

At 554, the key K and the stored sequence value $SQN_{MS}$ are accessed. For instance, the key K and the sequence value $SQN_{MS}$ can be accessed in a local memory of the mobile device. In the mobile device, the $SQN_{MS}$ can be stored in a USIM or another suitable computer-readable medium. The sequence value $SQN_{MS}$ can be a counter stored locally at the mobile device. The key K can be a long-term symmetric key stored by the mobile device and the network operator system. Additional or different types of keys may be used.

At 556, if the operator is using an operator constant, the random value RAND can be updated. The random value RAND can be updated in the same manner as in the process 500 at 508. For instance, RAND can be updated by computing RAND=RAND⊕$OP_C$ (where $OP_C$ is computed as described with respect to operation 508 in FIG. 5A).

At 558, the value Z is computed. Here, the value Z is computed by evaluating Z=KDF(K, RAND, outlen). The value Z can be computed by the mobile device using the same KDF and the same inputs that were used by the network operator system in the process 500 at 510.

At 560, f2, f3, f5 and optionally f5* are extracted from Z. For instance, the extraction process can include parsing Z or any other suitable technique.

At 562, the authentication token AUTN is parsed. For instance, parsing the authentication token (AUTN=SQN∥AMF∥$MAC_A$) can be done to retrieve the sequence number SQN, the authentication management field AMF, the message authentication code $MAC_A$, or any combination of them.

At 564, if masking is used, the sequence value SQN is masked. The sequence number SQN can be masked according to the technique used in the process 500 at 520. For instance, the sequence number can be masked by XORing the extracted sequence number SQN with f5 (SQN=SQN⊕f5).

At 566, temp is formed. The value temp can be formed by the same technique used in the process 500 at 514. For instance, the value temp can be formed by setting temp=SQN∥AMF∥SQN∥AMF, a concatenation of the extracted sequence number SQN and AMF.

At 568, a new value Z is computed. The new value Z can be computed by the same technique used to compute the new value Z in the process 500 at 516. For example, the new value Z can be computed by evaluating Z=KDF(K, RAND⊕temp, outlen').

At 570, f1, f1* and f4 are extracted from Z. For instance, the extraction process can include parsing Z or any other suitable technique.

At 572, $MAC_A$ is compared to f1. If they are not equal (i.e., if $MAC_A \neq f1$), the process can be halted. In the event that the process is halted, at 573 an error code is returned. Otherwise (i.e., if $MAC_A = f1$), the process can proceed to 574.

At 574, the validity of SQN is checked against $SQN_{MS}$. This check can be performed to determine if re-synchronization is needed. If SQN is not valid, resynchronization is performed at 575. Resynchronization can be performed by: (1) updating the sequence value $SQN_{MS}$, (2) computing Z=KDF(K, RAND⊕($SQN_{MS}$‖AMF*‖$SQN_{MS}$‖AMF*), outlen'), where AMF* is a default value, (3) extracting f1*=$MAC_S$ from Z, (4) if masking is used, applying the masking operation $SQN_{MS}=SQN_{MS}\oplus f5^*$, and (5) forming $AUTN_{MS}=SQN_{MS}\|MAC_S$. When SQN is valid, the process can proceed to 576.

At 576, a response RES, a cipher key CK and an integrity key IK are generated. For instance, the response RES and the session keys can be generated by the mobile device. Here the response RES=f2, the cipher key CK=f3, the integrity key IK=f4, and if required the mobile device authentication token $AUTN_{MS}$ may be generated as well.

At 578, the response RES is sent, and the mobile device authentication token $AUTN_{MS}$ may also be sent. For instance, RES and $AUTN_{MS}$ can be sent by the mobile device to the VLR. On receiving RES and $AUTH_{MS}$ from the mobile device, the VLR can verify that the response value RES is equal to the expected response value XRES. If RES=XRES, the verification is successful and the communication between the VLR and the mobile device is secured by the cipher and integrity keys CK and IK. If provided, the value $AUTN_{MS}$ can be sent to the HLR. Upon receipt of $AUTN_{MS}$, the HLR can verify the value $MAC_S$ and update the sequence value indicated by $SQN_{MS}$.

Figure 5E:
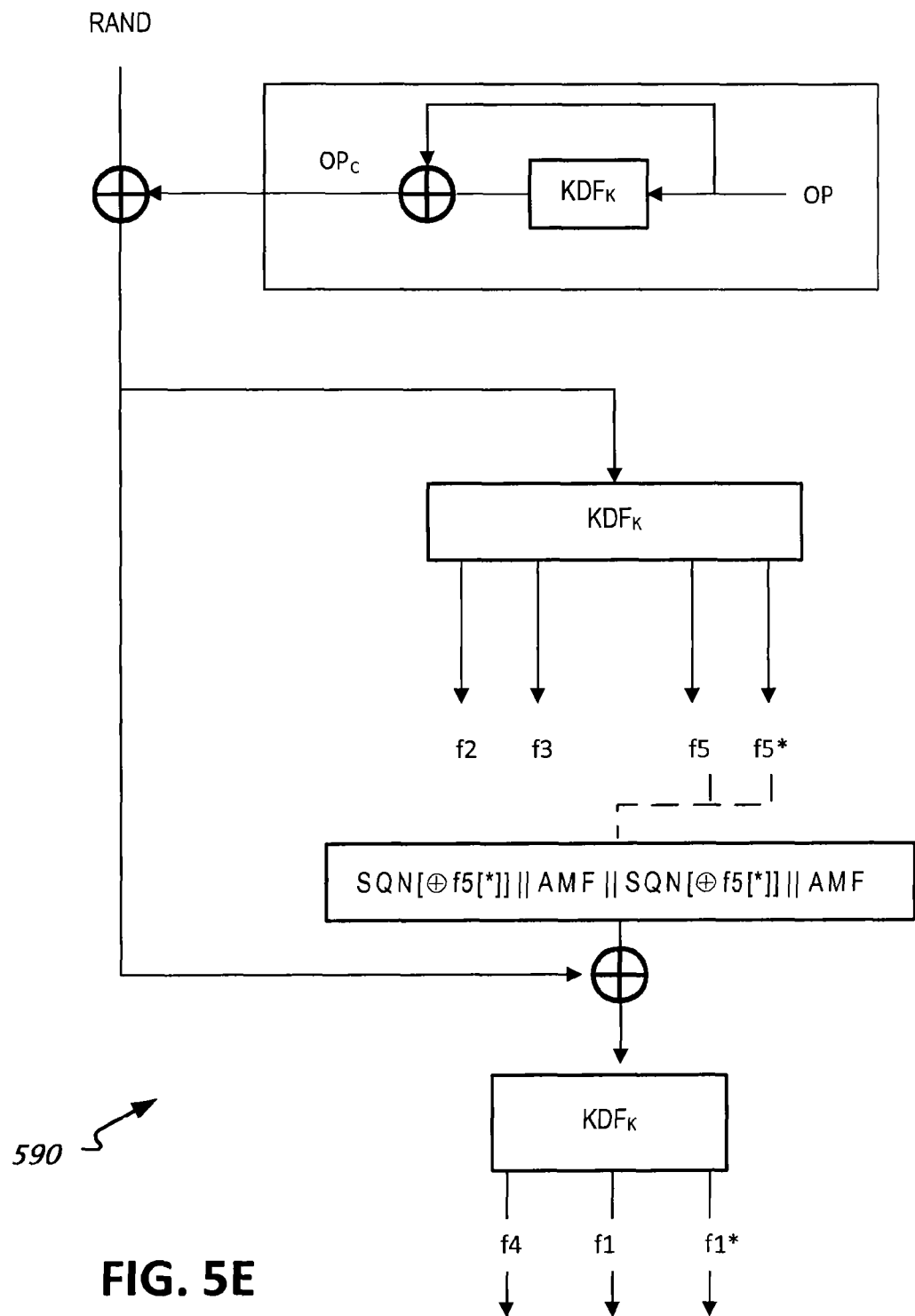
FIG. 5E is a schematic diagram showing aspects of the example technique shown in FIGS. 5A and 5B.

FIG. 5E is a schematic diagram 590 showing aspects of the example technique shown in FIGS. 5A and 5B. The operations shown in diagram 590 correspond to the operations in the example process 500 shown in FIGS. 5A and 5B. The diagram 590 is provided for illustration purposes. The process 500 may be implemented in another manner.

Figure 6A:
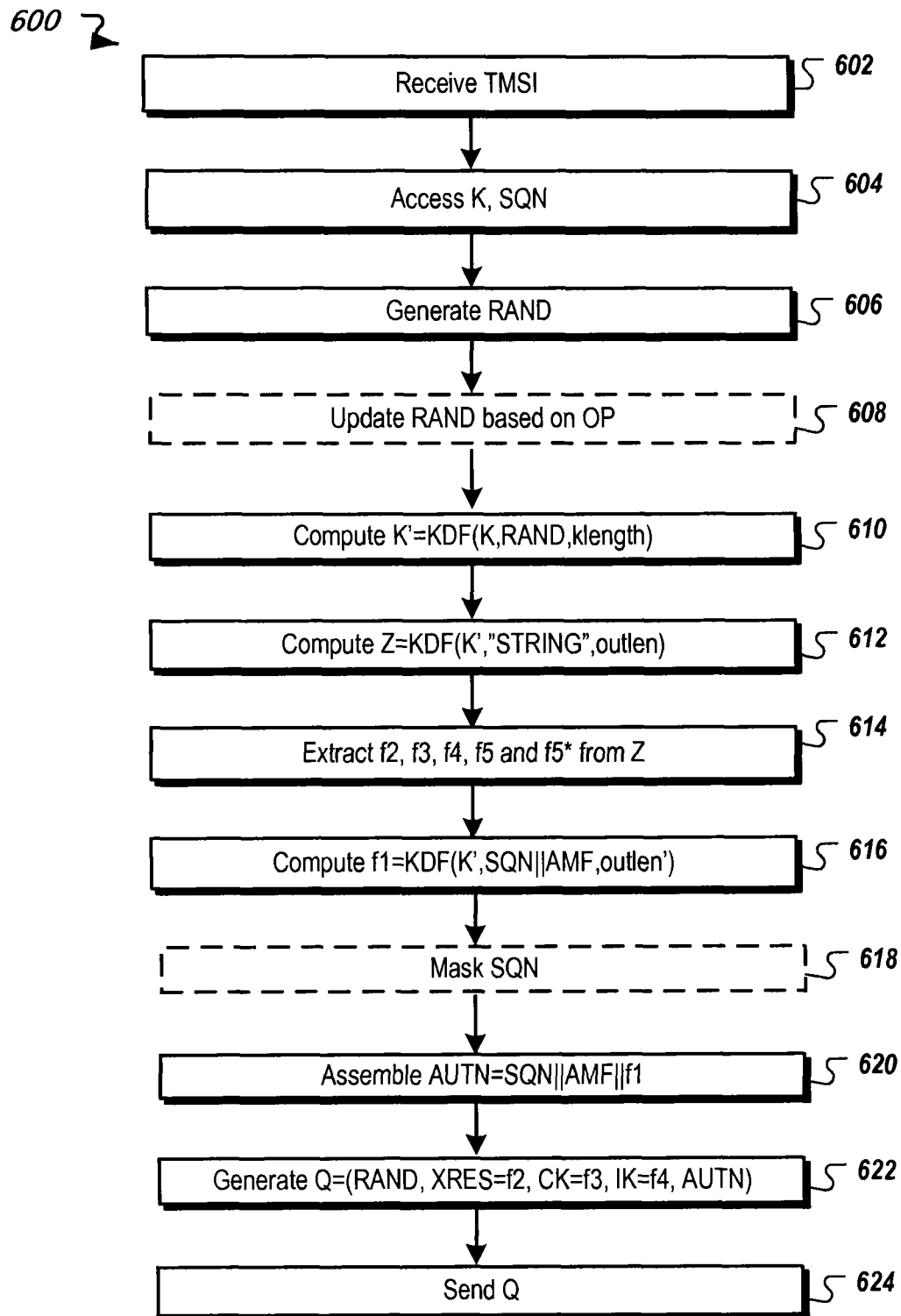
FIG. 6A is a flow diagram showing an example technique that can be used by a network operator system for authenticated key agreement in a UMTS system.

FIG. 6A is a flow diagram showing an example process 600 that can be used by a network operator system for authenticated key agreement in a UMTS system. The process 600 may be implemented, for example, by a server system of a wireless network or by any other suitable system. In some implementations, one or more operations of the process 600 are performed by a home location register (HLR) or by another component of the wireless network. The process 600 can include additional or different operations, and the operations can be performed in the order shown in FIG. 6A or any suitable order. In some cases, one or more of the operations can be iterated or repeated, for example, until a specified condition is reached.

At 602, a temporary mobile subscriber identity (TMSI) is received. The TMSI is associated with a mobile device. The TMSI can be received from the mobile device or from an entity in the wireless network system. For example, the HLR may receive the TMSI from a visitor location register (VLR) or from another component of the wireless network system. In some implementations, the mobile device wirelessly transmits the TMSI to the network, and the VLR forwards the TMSI to the HLR to authenticate the mobile device.

At 604, a key K and a sequence value SQN are accessed. The key K and the sequence value SQN are associated with the TMSI received at 602, and they may be accessed based on the TMSI. The key K and the sequence value SQN corresponding to the TMSI may be accessed in any suitable manner. For example, the HLR may access the key K and the sequence value SQN by searching a database for a record corresponding to the TMSI.

At 606, a random value RAND is generated. The random value RAND can be generated by any suitable technique. In some cases, the HLR can access a database of previously-generated random values, or the HLR may include a pseudorandom generator that generates random values as needed. The random value can be any suitable size or data format (e.g., binary, etc.).

At 608, the random value RAND may be updated. If the operator is using an operator constant OP, then $OP_c$ is computed. The value $OP_c$ can be used to update RAND, for example, by computing RAND=RAND⊕$OP_c$. The value $OP_c$ may be computed by evaluating $OP_c$=KDF(K, OF klength), where KDF represents a key derivation function. The inputs to KDF include OP (a 128-bit operator variant algorithm configuration field), K (a long-term secret key) and klength (a key length variable). In addition, $OP_c$ can be a 128-bit value derived from OP and K.

At 610, a key derivation key K' is computed. Here, the key derivation key can be computed by evaluating K'=KDF(K, RAND, klength). The inputs to KDF can include the key K, the random value RAND and klength, where klength represents the bit-length of the key derivation key K'. KDF can be any suitable key derivation function that accepts an input key and other input data to derive keying material. Example KDFs include the hash-based KDF using SHA256 defined in ANSI X9.63-2011, the counter-mode KDF defined in NIST SP800-108 with CMAC-AES128 from NIST SP800-38B, and the NIST counter-mode KDF defined in NIST SP800-108 with keyed-HMAC-SHA256 from FIPS 198-1. Additional or different KDFs may be used.

At 612, a new value Z is computed. Here, the new value Z can be computed by evaluating Z=KDF(K', "STRING", outlen). The inputs to this KDF can include key K, an input string "STRING" and outlen, which represents the sum of bit-lengths needed for f2, f3, f4, f5 and f5*. The input string "STRING" can be any constant that is known to both the mobile device and the network operator system.

At 614, f2, f3, f4, f5 and f5* are extracted from Z. For instance, the extraction process can include parsing Z or any other suitable technique.

At 616, the value f1 is computed. For instance, the value f1 can be computed by evaluating f1=KDF(K', SQN‖AMF, outlen'). Here, the inputs to KDF include the key derivation key K', the sequence number SQN concatenated with AMF and outlen', which represents the bit-length of f1.

At 618, if masking is used, the sequence value SQN can be masked. For example, the sequence value can be masked by computing SQN=SQN⊕f5. For each mobile device, the authentication center (AuC) can keep track of the sequence value SQN, which can facilitate re-synchronization.

At 620, the authentication token AUTN is assembled. Here, the authentication token AUTN can be assembled by forming AUTN=SQN‖AMF‖f1 (=$MAC_A$). For instance, AUTN can be assembled by the concatenation of the sequence number SQN, authentication management field AMF and the value f1.

At 622, an output quintet Q is generated. Here, the output quintet can be generated by forming Q=(RAND, XRES=f2, CK=f3, IK=f4, AUTN). For instance, Q can be an ordered array of authentication vector that can include a random number RAND, an expected response XRES, a cipher key CK, an integrity key IK and authentication token AUTN. In some cases, the quintet Q is valid for an authentication and key agreement between the VLR and the mobile device.

At 624, the output quintet Q is sent. The output quintet Q can be sent, for example, by the HLR to the VLR. The output quintet Q can be sent in any suitable form or format, using any suitable transmission technique. Subsequently, the VLR can extract RAND and AUTH and may forward these variables to the mobile device.

Figure 6B:
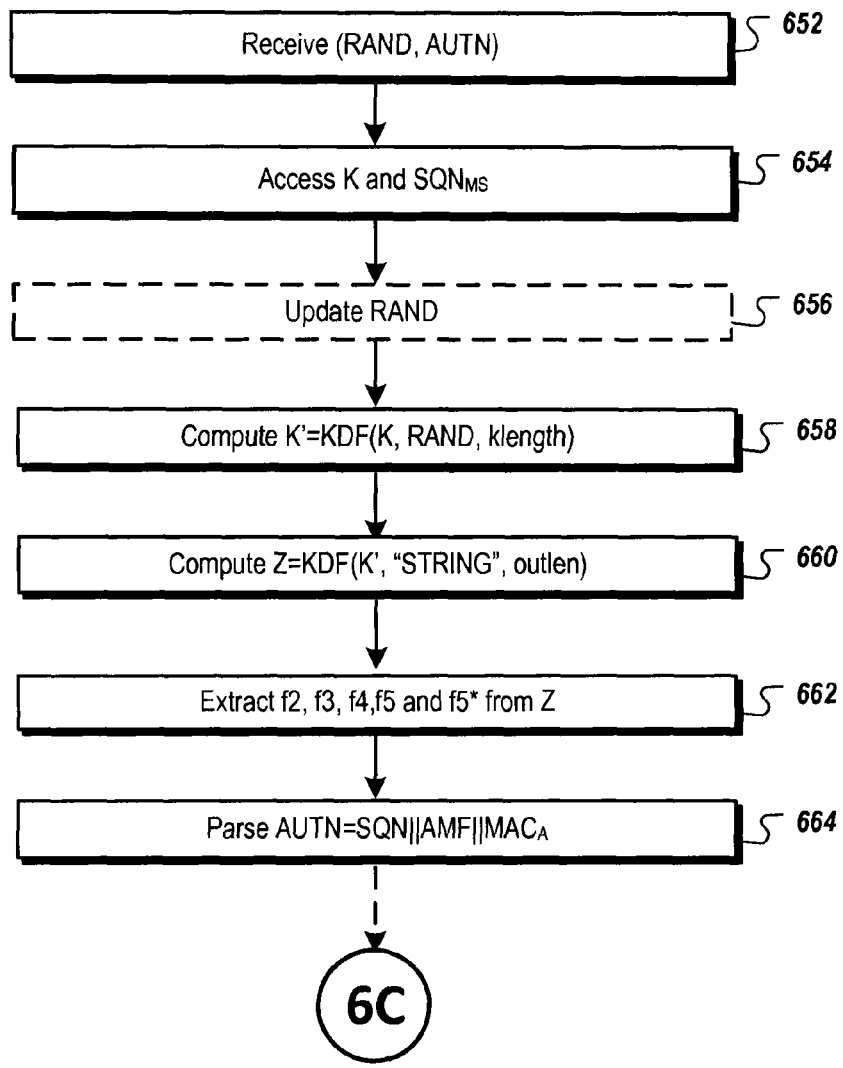
FIGS. 6B and 6C are flow diagrams showing an example technique that can be used by a mobile device for authenticated key agreement in a UMTS system.
Figure 6C:
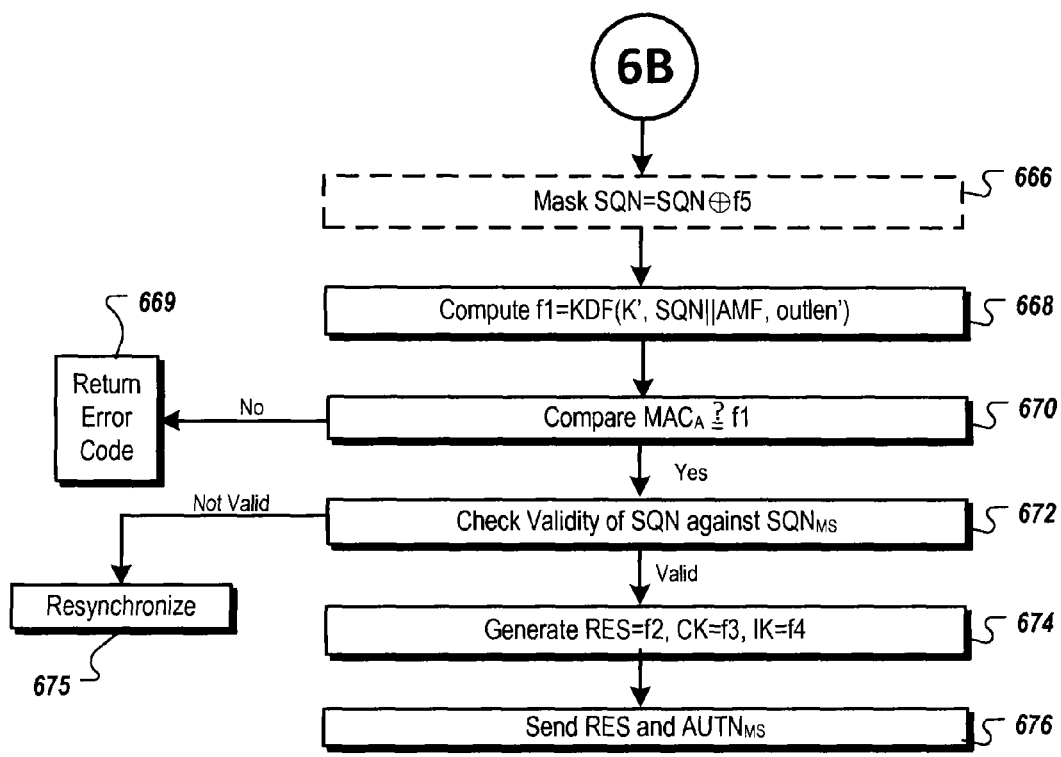

FIGS. 6B and 6C are flow diagrams showing an example process 650 that can be used by a mobile device for authenticated key agreement in a UMTS system. The process 650 may be implemented, for example, by a mobile device in a wireless communication system or by any other suitable system. In some implementations, the example process 650 shown in FIGS. 6B and 6C is performed by a mobile device in coordination with a wireless network server performing the example process 600 shown in FIG. 6A. The process 650 can include additional or different operations, and the operations can be performed in the order shown in FIGS. 6B and 6C or any suitable order. In some cases, one or more of the operations can be iterated or repeated, for example, until a specified condition is reached.

At 652, a random value RAND and an authentication token AUTN are received. The values may be received wirelessly by the mobile device from the wireless network. In some cases, RAND and AUTN can be sent to the mobile device by a VLR or another component of the wireless network system. In some cases, the random value RAND and the authentication token AUTN are the values generated by the network operator in the process 600 (e.g., at 606 or 608, 620) shown in FIG. 6A. For example, the VLR may parse the random value RAND and authentication token AUTN from the authentication vector AV sent to the VLR from the HLR, and the VLR may forward the parsed values to the mobile device for authentication.

At 654, the key K and the stored sequence value $SQN_{MS}$ are accessed. For instance, the key K and the sequence value $SQN_{MS}$ can be accessed in a local memory of the mobile device. In the mobile device, the $SQN_{MS}$ can be stored in an ISIM or another suitable computer-readable medium. The sequence value $SQN_{MS}$ can be a counter stored locally at the mobile device. The key K can be a long-term symmetric key stored by the mobile device and the network operator system. Additional or different types of keys may be used.

At 656, if the operator is using an operator constant, the random value RAND can be updated. The random value RAND can be updated in the same manner as in the process 600 at 608. For instance, RAND can be updated by computing RAND=RAND⊕$OP_C$ (where $OP_C$ is computed as described with respect to operation 608 in FIG. 6A).

At 658, the key derivation key K' is computed. The key derivation key K' can be computed by evaluating K'=KDF (K, RAND, klength). The key derivation key K' can be computed by the mobile device using the same KDF and the same inputs that were used by the network operator system in the process 600 at 610.

At 660, the value Z is computed. The value Z can be computed by evaluating Z=KDF(K, RAND, outlen). The value Z can be computed by the mobile device using the same KDF and the same inputs that were used by the network operator system in the process 600 at 612.

At 662, the values f2, f3, f4, f5 and f5* are extracted from Z. For instance, the extraction process can include parsing Z or any other suitable technique.

At 664, the authentication token AUTN is parsed. For instance, parsing the authentication token (AUTN=SQN∥AMF∥$MAC_A$) can be done to retrieve the sequence number SQN, the authentication management field AMF, the message authentication code $MAC_A$, or any combination of them.

At 666, if masking is used, the sequence value SQN is masked. The sequence number SQN can be masked according to the technique used in the process 600 at 618. For instance, the sequence number can be masked by XORing the extracted sequence number SQN with f5 (SQN=SQN⊕f5).

At 668, the value f1 is computed. For instance, the value f1 can be computed by evaluating f1=KDF(K', SQN∥AMF, outlen'). Here, the KDF and the input values can be the same as those used by the network operator in the process 600 at 616 to compute the value f1.

At 670, $MAC_A$ is compared to f1. If they are not equal (i.e., if $MAC_A$≠f1), the process can be halted. In the event that the process is halted, at 669 an error code is returned. Otherwise (i.e., if $MAC_A$=f1), the process can proceed to 672.

At 672, the validity of SQN is checked against $SQN_{MS}$. This check can be performed to determine if re-synchronization is needed. If SQN is not valid, resynchronization is performed at 675. Resynchronization can be performed by: (1) updating the sequence value $SQN_{MS}$, (2) computing f1*=KDF(K', $SQN_{MS}$∥AMF*, outlen'), where AMF* is a default value, (3) if masking is used, applying the masking operation $SQN_{MS}$=$SQN_{MS}$⊕f5*, and (4) forming $AUTN_{MS}$=$SQN_{MS}$∥$MAC_S$. When SQN is valid, the process can proceed to 674.

At 674, a response RES, a cipher key CK and an integrity key IK are generated. For instance, the response RES and the session keys can be generated by the mobile device. Here the response RES=f2, the cipher key CK=f3, the integrity key IK=f4, and if required the mobile device authentication token $AUTN_{MS}$ may be generated as well.

At 676, the response RES is sent, and the mobile device authentication token $AUTN_{MS}$ may also be sent. For instance, RES and $AUTN_{MS}$ can be sent by the mobile device to the VLR. On receiving RES and $AUTH_{MS}$ from the mobile device, the VLR can verify that the response value RES is equal to the expected response value XRES. If RES=XRES, the verification is successful and the communication between the VLR and the mobile device is secured by the cipher and integrity keys CK and IK. If provided, the value $AUTN_{MS}$ can be sent to the HLR. Upon receipt of $AUTN_{MS}$, the HLR can verify the value $MAC_S$ and update the sequence value indicated by $SQN_{MS}$.

Figure 6D:
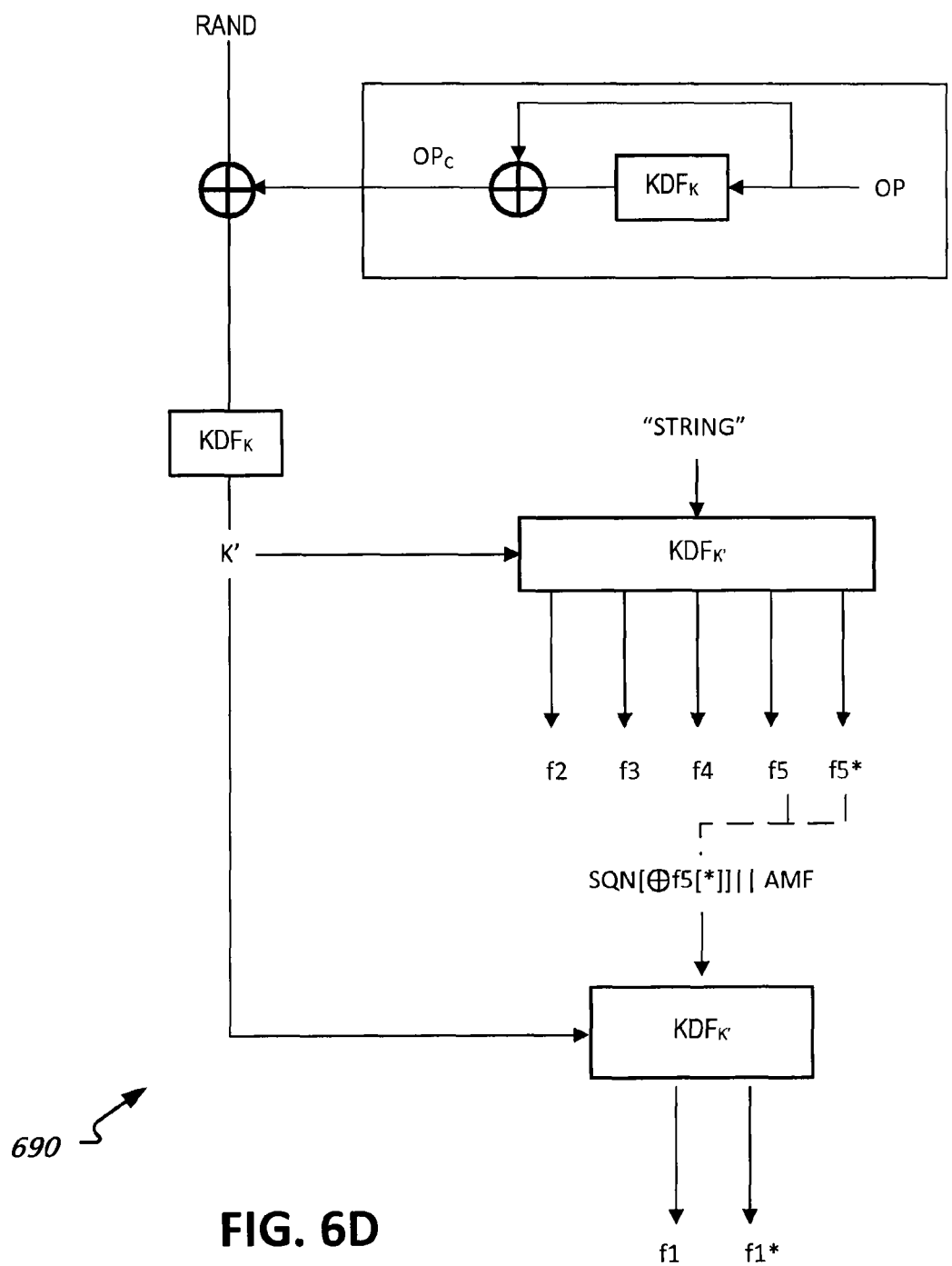
FIG. 6D is a schematic diagram showing aspects of the example technique shown in FIG. 6A.

FIG. 6D is a schematic diagram showing aspects of the example technique shown in FIG. 6A. The operations shown in diagram 690 correspond to the operations in the example process 600 shown in FIG. 6A. The diagram 690 is provided for illustration purposes. The process 600 may be implemented in another manner.

Operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, one or more session keys are generated in a communication system. A session key may be generated, for example, by a mobile device, a network operator system, another type of system, or by any suitable combination of these.

In some aspects, a computer system of a wireless network operator receives an identifier of a mobile device. Based on the identifier, a secret key associated with the mobile device is accessed. A message authentication code function is evaluated based on the secret key to produce an output value. A session key is obtained based on the output value.

Implementations of these and other aspects may include one or more of the following features. A random challenge value is obtained before evaluating the message authentication code function. An expected response value, a ciphering key, and an integrity key are obtained based on the output value from the message authentication code function. A message that includes the ciphering key, the integrity key, the random challenge value, and the expected response value is generated. The message is transmitted to a wireless station of a wireless network.

Additionally or alternatively, implementations of these and other aspects may include one or more of the following features. The message authentication code function is evaluated by evaluating a key derivation function that includes the message authentication code function. The key derivation function is evaluated on the secret key, an output length that specifies a bit-length of the output value, and possibly other input values. The other inputs include a random challenge value that is obtained after receiving the identifier of the mobile device. An expected response value is obtained based on the output value.

Additionally or alternatively, implementations of these and other aspects may include one or more of the following features. Generating the session key based on the output value includes evaluating the message authentication code function based on the output value to produce another output value and generating the session key based on the other output value.

Additionally or alternatively, implementations of these and other aspects may include one or more of the following features. A message authentication code is obtained based on the secret key, a sequence value associated with the mobile device is accessed, and a server authentication token is obtained based on the message authentication code and the sequence value.

In some aspects, a mobile device receives a challenge value from a wireless network. The mobile device accesses a secret key in response to receiving a challenge value from a wireless network operator system. A message authentication code function is evaluated based on the secret key to produce an output value. A response value and a session key are obtained based on the output value. The response value is transmitted to the wireless network operator system.

Implementations of these and other aspects may include one or more of the following features. Obtaining the session key includes obtaining a ciphering key and an integrity key. The message authentication code function is evaluated by evaluating a key derivation function that includes the message authentication code function. The key derivation function is evaluated on the secret key, the challenge value, and an output length that specifies a bit-length of the output value.

Additionally or alternatively, implementations of these and other aspects may include one or more of the following features. A message authentication code is obtained based on the secret key and the challenge value. A sequence value previously stored on the mobile device is accessed. A mobile device authentication token is generated based on the message authentication code and the sequence value.

Thus, some implementations of the subject matter have been described. Other implementations are within the scope of the following claims.

What is claimed is:

1. A method performed by a computer system of a wireless network operator, the method comprising:
 the computer system receiving an identifier of a mobile device;
 the computer system obtaining a challenge;
 the computer system accessing, based on the identifier, a secret key stored in a database, the secret key associated with the mobile device;
 the computer system evaluating a message authentication code (MAC) function based on the secret key and the challenge to produce an output value;
 the computer system obtaining a session key and an expected response based on the output value;
 the computer system transmitting to a message to the mobile device, the message including the challenge;
 the computer system receiving from the mobile device a response generated by the mobile device based on the secret key and the challenge; and
 in response to determining that the response received from the mobile device matches the expected response, utilizing a secure communication channel with the mobile device that utilizes the session key.

2. The method of claim 1, wherein obtaining the session key comprises obtaining a plurality of session keys, and the plurality of session keys include a ciphering key and an integrity key.

3. The method of claim 2, wherein:
 the computer system obtaining the challenge comprising obtaining a random challenge value before evaluating the MAC function;
 the method further comprising:
  the computer system generating a second message that includes the ciphering key, the integrity key, the random challenge value, and the expected response value; and
  the computer system transmitting the second message to a wireless station of a wireless network.

4. The method of claim 1, wherein the MAC function is evaluated by evaluating a key derivation function (KDF) that includes the MAC function.

5. The method of claim 4, wherein the KDF is evaluated on a plurality of input values including:
 the secret key; and
 an output length that specifies a bit-length of the output value.

6. The method of claim 5, wherein the computer system obtaining the challenge comprises obtaining a random challenge value after receiving the identifier of the mobile device.

7. The method of claim 1, wherein generating the session key based on the output value includes:
 the computer system evaluating the MAC function based on the output value to produce another output value; and
 the computer system generating the session key and the expected response based on the other output value.

8. The method of claim 1, further comprising:
 the computer system obtaining a MAC based on the secret key;
 the computer system accessing a sequence value associated with the mobile device; and
 the computer system generating a server authentication token based on the MAC and the sequence value.

9. A wireless network operator system comprising:
a communication interface operable to receive an identifier of a mobile device, and a response from the mobile device;
data processing apparatus operable to:
obtain a challenge;
access, based on the identifier, a secret key stored in a database, the secret key associated with the mobile device;
evaluate a message authentication code (MAC) function based on the secret key and the challenge to produce an output value;
obtain a session key and an expected response based on the output value;
transmit a message to the mobile device, the message including the challenge;
determine that the response from the mobile device matches the expected response, wherein the response received from the mobile device is based on the secret key and the challenge;
in response to determining that the response received from the mobile device matches the expected response, utilize a secure communication channel with the mobile device that utilizes the session key.

10. The wireless network operator system of claim 9, wherein obtaining the session key comprises obtaining a plurality of session keys, and the plurality of session keys include a ciphering key and an integrity key.

11. The wireless network operator system of claim 10, wherein:
obtaining the challenge comprising obtaining a random challenge value before evaluating the MAC function; and
the data processing apparatus is further operable to:
generate a second message that includes the ciphering key, the integrity key, the random challenge value, and the expected response value; and
wherein the communication interface is operable to transmit the second message to a wireless station of a wireless network.

12. The wireless network operator system of claim 9, wherein the MAC function is evaluated by evaluating a key derivation function (KDF) that includes the MAC function.

13. The wireless network operator system of claim 12, wherein the KDF is evaluated on a plurality of input values including:
the secret key; and
an output length that specifies a bit-length of the output value.

14. The wireless network operator system of claim 13, wherein obtaining the random value comprising obtaining a random challenge value.

15. The wireless network operator system of claim 9, wherein the data processing apparatus is further operable to:
obtain a MAC based on the secret key;
access a sequence value associated with the mobile device; and
generate a server authentication token based on the MAC and the sequence value.

16. A method performed by a mobile device, the method comprising:
the mobile device accessing a secret key in response to receiving a challenge value from a wireless network operator system;
the mobile device evaluating a message authentication code (MAC) function based on the secret key and the challenge value to produce an output value;
the mobile device obtaining a response value and a session key based on the output value; and
the mobile device transmitting the response value to the wireless network operator system;
in response to the wireless network operator system determining that the response value matches an expected response value, utilizing a secure communication channel to communicate with the wireless network operator system, the communication utilizing the session key.

17. The method of claim 16, wherein obtaining the session key comprises the mobile device obtaining a plurality of session keys, and the plurality of session keys include a ciphering key and an integrity key.

18. The method of claim 16, wherein the MAC function is evaluated by evaluating a key derivation function (KDF) that includes the MAC function.

19. The method of claim 18, wherein the KDF is evaluated on a plurality of input values including:
the secret key;
the challenge value; and
an output length that specifies a bit-length of the output value.

20. The method of claim 16, further comprising:
the mobile device obtaining a MAC based on the secret key and the challenge value;
the mobile device accessing a sequence value previously stored on the mobile device; and
the mobile device generating a mobile device authentication token based on the MAC and the sequence value.

* * * * *